(12) United States Patent
Dehmubed et al.

(10) Patent No.: US 10,812,145 B1
(45) Date of Patent: **\*Oct. 20, 2020**

(54) PACKAGING SYSTEM WITH DETECTION OF ENVIRONMENTAL CONDITIONS

(71) Applicant: eTEP Inc., San Francisco, CA (US)

(72) Inventors: Rohinton S. Dehmubed, San Francisco, CA (US); Peter Gompper, San Francisco, CA (US)

(73) Assignee: eTEP Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,974

(22) Filed: Jun. 21, 2019

(51) Int. Cl.
*H04B 5/00* (2006.01)
*B65D 90/51* (2019.01)

(52) U.S. Cl.
CPC ........... *H04B 5/0025* (2013.01); *B65D 90/51* (2019.02); *H04B 5/0012* (2013.01)

(58) Field of Classification Search
CPC .... H04B 5/0025; H04B 5/0012; B65D 65/40; B65D 90/50; B65D 90/51; G06K 7/10445
See application file for complete search history.

(56) References Cited

U.S. PATENT DOCUMENTS

| | | | |
|---|---|---|---|
| 5,294,470 A | 3/1994 | Ewan | |
| 6,063,503 A | 5/2000 | Hatakeyama et al. | |
| 6,287,965 B1 | 9/2001 | Kang et al. | |
| 6,391,407 B1 | 5/2002 | Kashiba et al. | |
| 7,170,409 B2 | 1/2007 | Ehrensvard et al. | |
| 7,570,169 B2 | 8/2009 | Li et al. | |
| 9,494,541 B2 | 11/2016 | Potyrailo et al. | |
| 10,323,373 B2 | 6/2019 | Dehmubed et al. | |
| 10,332,373 B1 * | 6/2019 | Dehmubed | ........ G08B 13/2442 |
| 2004/0066296 A1 | 4/2004 | Atherton | |

(Continued)

FOREIGN PATENT DOCUMENTS

WO   WO2017/024281 A1   2/2017

OTHER PUBLICATIONS

Inkjet-Printed Humidity Sensor for Passive UHD RFID Systems, Juha Virtanen et al., IEEE Transactions on Instrumentation and Measurement, vol. 60 No. 8, Aug. 2011.

(Continued)

*Primary Examiner* — Nguyen T Vo
(74) *Attorney, Agent, or Firm* — Gordon & Jacobson, P.C.

(57) ABSTRACT

A packaging system for at least one article includes a multilayer laminate structure and at least one sensor. The laminate structure encapsulates a transformative material between first and second conductive layers, which undergoes a state change that changes impedance between the first and second conductive layers in response to a perforation produced by the at least one sensor. An NFC/RFID circuit is electrically coupled to the first and second conductive layers of the multilayer laminate structure. At least one operational characteristic of the NFC/RFID circuit is dependent on the impedance change between the first and second conductive layers in response to a perforation produced by the sensor under predetermined environmental conditions. The operational characteristic(s) of the NFC/RFID circuit can be ascertained and analyzed (for example, by operations of an NFC/RFID interrogator) to detect and register the predetermined environmental conditions and provide an indication thereof.

25 Claims, 26 Drawing Sheets

(56) References Cited

U.S. PATENT DOCUMENTS

| | | |
|---|---|---|
| 2008/0223936 A1 | 9/2008 | Mickle et al. |
| 2009/0184824 A1 | 7/2009 | Forster |
| 2011/0011179 A1 | 1/2011 | Gustafsson et al. |
| 2011/0236703 A1 | 9/2011 | McGee |
| 2011/0239450 A1 | 10/2011 | Basol et al. |
| 2013/0008332 A1 | 1/2013 | Nair et al. |
| 2013/0068842 A1 | 3/2013 | Kuo et al. |
| 2013/0105586 A1* | 5/2013 | Sykko .............. G06K 19/07758 235/492 |
| 2013/0135104 A1 | 5/2013 | Nikkanen |
| 2016/0192188 A1 | 6/2016 | Coulier |
| 2019/0135501 A1* | 5/2019 | Chandra .................. B65C 3/24 |

OTHER PUBLICATIONS

A Wireless Passive Humidity Threshold Monitoring Solution Based on a Permanent Resistance Change, Sebastian Sauer et al., Procedia Engineering 87 (2014) 688-691.
Circus Tamper Loop: A New Digital Seal For Your Products; Smartrac N.V. Oct. 2018.
Flexure-based Roll-to-roll Platform: A Practical Solution for Realizing Large-area Microcontact Printing, Xi Zhou et al., Scientific Reports, 5:10402; Jun. 3, 2015.

* cited by examiner

PACKAGING SYSTEM WITH DETECTION OF ENVIRONMENTAL CONDITIONS

BACKGROUND

1. Field

The present disclosure relates to packaging solutions that can detect and register the occurrence of certain environmental conditions or events associated with at least one packaged item. The present disclosure also relates to packaging solutions that can provide information regarding such environmental conditions or events for track-and-trace services throughout a supply chain.

2. State of the Art

Many products must avoid certain environmental conditions in order to prevent spoilage or a reduction in product quality, value and safety.

For example, a freeze event or threshold temperature excursion can spoil temperature-sensitive food products and some pharmaceutical products (such as vaccines) or cause a reduction in product quality, value or safety. Packaging for such products can employ temperature sensors or temperature indicators for monitoring and detecting a freeze event or one more threshold temperature excursions associated with the packaging while shipping and storing the packaging. Detection of the freeze event or threshold temperature excursion can be used as an indicator of possible spoilage and suitable actions can be taken.

In another example, the presence of moisture can spoil certain fabric, food, chemical, or pharmaceutical products or cause a reduction in product quality, value or safety. Packaging for such products can employ moisture or humidity sensors or indicators for detecting one or more humidity level excursions associated with the packaging while shipping and storing the packaging. Detection of a humidity level excursion can be used as an indicator of possible spoilage or unwanted condition and suitable actions can be taken.

Current packaging designs employ devices, such as temperature or humidity level indicators sold commercially by Uline of Pleasant Prairie, Wis., that are separate from the packaged product and placed within a package to monitor temperature or humidity excursions during shipping and storage. The temperature or humidity level indicators have localized areas that change color as temperature or humidity level exceed certain threshold levels. In addition, nefarious actors can possibly remove or tamper with these monitoring devices to thwart the monitoring functions of such devices.

SUMMARY

In embodiments, a packaging system for at least one article includes a multilayer laminate structure and at least one sensor. The multilayer laminate structure includes an encapsulated transformative material disposed between first and second conductive layers. The transformative material is configured to undergo a state change (for example, by chemical reaction or physical change) that changes impedance between the first and second conductive layers in response to a perforation produced by the at least one sensor. An NFC/RFID circuit is electrically coupled to the first and second conductive layers of the multilayer laminate structure. At least one operational characteristic of the NFC/RFID circuit is dependent on the impedance change between the first and second conductive layers in response to a perforation produced by the sensor under predetermined environmental conditions. The operational characteristic(s) of the NFC/RFID circuit can be ascertained and analyzed (for example, by suitable operations of an external NFC/RFID interrogator) to detect and register the predetermined environment conditions and provide an indication of the predetermined environmental conditions that caused the perforation if and when detected.

In embodiments, the sensor can include a spring element (such as a spring-diaphragm) and a spring-activated perforating element that are held in a spring-loaded state by an environmentally-sensitive material, wherein the environmentally-sensitive material is configured to change its state in response to the predetermined environmental conditions and release the spring element and perforating element such that the perforating element produces the perforation. In embodiments, the environmentally-sensitive material can be temperature-sensitive and configured to melt or soften at predetermined temperature conditions in order to release the spring element and perforating element such that the perforating element produces the perforation. In other embodiments, the environmentally-sensitive material can be sensitive to water or moisture and dissolves at predetermined water or moisture conditions in order to release the spring element and perforating element such that the perforating element produces the perforation.

In embodiments, the multilayer laminate structure can have a first configuration that provides a relatively high impedance electrical current path between the first and second conductive layers under normal conditions absent intrusion or perforation. The multilayer laminate structure can also have a second configuration where a state change (for example, by a chemical reaction or physical change) of the transformative material provides part or all of a relatively low impedance electrical current path between the first and second conductive layers. The multilayer laminate structure can automatically transition from the first configuration to the second configuration in response to an intrusion or perforation produced by the sensor under predetermined environmental conditions.

In embodiments, the multilayer laminate structure can function under normal conditions as a flexible two-plate capacitor with the first and second conductive layers equivalent to the two plates of the capacitor, and the encapsulated transformative material equivalent to the dielectric medium between the two plates. As a two-plate capacitor, the multilayer laminate structure provides a relatively high impedance electrical current path between the first and second conductive layers of the multilayer laminate structure. In response to an intrusion or perforation produced by the sensor under predetermined environmental conditions, the transformative material undergoes a state change (for example, by chemical reaction or physical change) such that the material provides part or all of a relatively low impedance electrical current path between the first and second conductive layers.

In embodiments, the packaging system can further include an antenna with two antenna terminals that are electrically coupled to the NFC/RFID circuit. The antenna can be printed on a flexible substrate that also supports the NFC/RFID circuit. These components can be mounted on or otherwise supported by the multilayer laminate structure.

In embodiments, the NFC/RFID circuit can be a passive NFC/RFID circuit which does not contain a battery, but instead harvests electrical power from the RF signal supplied by an external NFC/RFID interrogator. In this case, the passive NFC/RFID circuit can be configured to cooperate with the antenna to receive and store electrical power from electromagnetic radiation emitted by an external NFC/RFID interrogator.

In embodiments, the first and second conductive layers of the multilayer laminate structure can be electrically coupled to the two antenna terminals. In such embodiments, under normal conditions absent intrusion or perforation, the multilayer laminate structure can be configured to provide a relatively high impedance electrical current path between the first and second conductive layers and the two antenna terminals electrically coupled thereto. The relatively high impedance electrical current path between the two antenna terminals allows the passive NFC/RFID circuit to harvest power from the electromagnetic radiation provided by an external NFC/RFID interrogator and use such harvested power as supply to the electrical components of the passive NFC/RFID circuit for its operations. The transformative material can also be configured to undergo a state change (for example, by a chemical reaction or physical change) such that the material provides part or all of a relatively low impedance electrical current path between the first and second conductive layers and the two antenna terminals electrically coupled thereto in response to an intrusion or perforation produced by the sensor under predetermined environmental conditions. Such relatively low impedance electrical current path automatically configures the passive NFC/RFID circuit to remain in a power-off state in the presence of electromagnetic radiation that is normally sufficient to provide electrical power to the passive NFC/RFID circuit. In this manner, if the passive NFC/RFID circuit remains in a power-off state in the presence of electromagnetic radiation provided by an external NFC/RFID interrogator that is normally sufficient to provide electrical power to the passive NFC/RFID circuit, the external NFC/RFID interrogator can sense this power-off state, interpret this power-off state as a signal of the perforation produced by the sensor under predetermined environmental conditions, and output an indication (e.g., visual or audible notification) of the predetermined environmental conditions that caused the perforation if and when detected.

In other embodiments, one of the first and second conductive layers of the multilayer laminate structure can be configured to define a detection surface. In this embodiment, the transformative material can be configured to undergo a stage change (for example, by chemical reaction or physical change) that changes impedance between the detection surface and the other conductive layer in response to an intrusion or perforation in the detection surface. The detection surface can be electrically coupled to a corresponding input terminal of the NFC/RFID circuit. The NFC/RFID circuit can be configured to detect a signal at the input terminal that results from the impedance change between the detection surface and the other conductive layer due to the intrusion or perforation in the detection surface produced by the sensor under predetermined environmental conditions. The NFC/RFID circuit can be further configured to derive and register data from such signal and communicate the data to an external NFC/RFID interrogator. The external NFC/RFID interrogator can analyze the data communicated from the NFC/RFID circuit to interpret the data as a signal of the perforation produced by the sensor under predetermined environmental conditions (for example, by comparing the data to the expected data value(s) representing a perforation or non-perforation event), and output an indication (e.g., visual or audible notification) of the predetermined environmental conditions that caused the perforation if and when detected.

In embodiments, the multilayer laminate structure can have a first configuration that provides a relatively high impedance electrical current path between the detection surface and the other conductive layer under normal conditions absent intrusion in vicinity of the detection surface. The multilayer laminate structure can also have a second configuration where the transformative material undergoes a state change (for example, by a chemical reaction or physical change) such that the material provides all or part of a relatively low impedance electrical current path between the detection surface and the other conductive layer in response to the intrusion or perforation in the detection surface produced by the sensor under predetermined environmental conditions. A resistor can be electrically coupled between a positive voltage supply terminal of the NFC/RFID circuit and the detection surface. The other conductive layer can be electrically connected to a ground or common body terminal of the NFC/RFID circuit.

In embodiments, the multilayer laminate structure can function under normal conditions as a flexible two-plate capacitor with the detection surface equivalent to one plate and the other conductive layer equivalent to an opposed plate of the capacitor, and the encapsulated transformative material equivalent to the dielectric medium between the two plates. As a two-plate capacitor, the multilayer laminate structure provides a relatively high impedance electrical current path between the detection surface and the other conductive layer. In response to an intrusion or perforation in the detection surface produced by the sensor under predetermined environmental conditions, the transformative material can be configured to undergo a state change (for example, by a chemical reaction or physical change) such that the material provides all or part of a relatively low impedance electrical current path between the detection surface and the other conductive layer.

In embodiments, the transformative material can undergo a state change (for example, by chemical reaction or physical change) that causes a change in impedance between the opposed conductive layers of the multilayer laminate structure. For illustration purposes, a silver nitrate gel solution can be used for the transformative material. Absent an intrusion or perforation, the multilayer laminate structure provides a relatively high impedance electrical current path between the first and second conductive layers of the multilayer laminate structure. In response to an intrusion or perforation produced by the sensor under predetermined environmental conditions, the silver nitrate gel solution can form all or part of a relatively low impedance electrical current path between the first and second conductive layers of the multilayer laminate structure. The silver nitrate gel solution by itself is conductive and it can flow to contact both of the first and second conductive layers of the multilayer laminate structure in response to the intrusion or perforation. In this manner, the flow of the silver nitrate gel solution can form all or part of a relatively low impedance current path between the first and second conductive layers. Furthermore, with the silver nitrate gel solution in contact with the appropriate metal(s) of the first and second conductive layers, the silver nitrate gel solution can undergo a galvanic displacement reaction that precipitates solid-phase silver in response to the intrusion or perforation. The solid-phase silver precipitate in conjunction with the conductive silver nitrate gel solution can also form all or part of a relatively low impedance electrical current path between the first and second conductive layers. Moreover, the precipitation of the solid-phase silver can continue such that the solid-phase silver precipitate extends between first and second conductive layers and the solid-phase silver precipitate alone (without any conductive silver nitrate gel solution) forms all or part of a relatively low impedance electrical current path between the first and second conductive layers.

In embodiments, the first conductive layer can include a conductive surface such as a layer of noble metal (e.g., of copper, magnesium, zinc, tin or other material) that undergoes a galvanic displacement reaction with metal ions of a solution (e.g., silver ions of a silver nitrate gel solution) to precipitate solid-phase metal from the solution. A first intermediate layer can be disposed between the metal ion solution and the first metal layer and aid in encapsulating the metal ion solution. The first intermediate layer can be formed from an electrically-insulating material such as polyethylene terephthalate (PETG), photo-resistant polymer, Mylar, a spun polymer with a metallic oxide coating, or other encapsulating or insulating material. Alternatively, the first intermediate layer can be formed from a thin film of conductive material, such as a conductive polymer. The first intermediate layer does not undergo a galvanic displacement reaction with the metal ion solution. In this configuration, the metal(s) of the first metal layer would undergo the galvanic displacement reaction with metal ions of the solution if in contact with the metal ion solution, but it is inhibited from doing so by the intervening first intermediate layer.

In embodiments, the second conductive layer can include a metal layer formed from one or more noble metals (such as gold or platinum) that does not undergo a galvanic displacement reaction with metal ions of the metal ion solution to precipitate solid-phase metal from the metal ion solution. In this configuration, this metal layer can aid in encapsulating the metal ion solution.

In other embodiments, the second conductive layer can include a metal layer formed from one or more noble metals (such as copper, magnesium, zinc, tin or other material) that does undergo a galvanic displacement reaction with metal ions of the metal ion solution to precipitate solid-phase metal from the metal ion solution. In this embodiment, a second intermediate layer can be disposed between the second conductive layer and the metal ion solution. The second intermediate layer can be formed from a thin film of conductive material (such as a conductive polymer layer). The conductive material can be selected such that it does not undergo a galvanic displacement reaction with the metal ion solution that precipitates solid-phase metal yet provides for a low impedance electrical current path through the conductive material to the second conductive layer. In this configuration, the at least one noble metal of the second conductive layer would undergo the galvanic displacement reaction with metal ions of the metal ion solution if in contact with the metal ion solution, but it is inhibited from doing so by the intervening second intermediate layer.

In embodiments, the multilayer laminate structure can include an encapsulated reagent disposed between the first and second conductive layers. The reagent can be configured to react with the transformative material in response to an intrusion event and aids in the transformation of the transformative material. For illustrative purposes, in the case where the transformation material is a silver nitrate gel solution, the reagent can be a solution of sodium borohydride and/or glucose that assists or enhances the galvanic displacement reaction of silver nitrate solution that precipitates solid-phase silver. The reagent can possibly include other components such as catalysts, stabilizers, surfactants or initiators, in any combination thereof.

In embodiments, the multilayer laminate structure can include microcapsules of reagent that are dispersed in a matrix of the transformative material.

In other embodiments, the multilayer laminate structure can include microcapsules of the transformative material that are dispersed in a matrix of the reagent.

In yet another embodiment, the multilayer laminate structure can include microcapsules of transformative material and microcapsules of reagent that are both dispersed in an inert matrix.

In embodiments, the multilayer laminate structure can be secured with a sealant about an opening into a rigid closed-wall container (such as glass bottle) that houses the at least one article. In this configuration, the multilayer laminate structure provides a sealed protective sensing barrier that can detect predetermined environmental conditions of the interior space of the container that houses the at least one article.

In other embodiments, the multilayer laminate structure can define a space that houses the at least one article. For example, the multilayer laminate structure can be configured in a folded arrangement to define a sealed envelope or pouch or box that defines a space that houses the at least one article. In this configuration, the multilayer laminate structure provides a sealed protective sensing barrier that can detect predetermined environmental conditions of the interior space of the container that houses the at least one article.

In embodiments, the multilayer laminate structure can include a plurality of coplanar detection surfaces. A plurality of sensors can be provided that produce perforations in the plurality of coplanar detection surfaces in response to different environmental conditions. The plurality of coplanar detection surfaces can be electrically coupled to separate inputs of at least one NFC/RFID circuit and corresponding coil antenna in order to register the different environmental conditions.

In other embodiments, the multilayer laminate structure can include a plurality of stacked detection surfaces. A plurality of sensors can be provided that produce perforations in the plurality of stacked detection surfaces in response to different environmental conditions. The plurality of stacked detection surfaces can be electrically coupled to separate inputs of at least one NFC/RFID circuit and corresponding coil antenna in order to register the different environmental conditions.

In another aspect, a method is provided to monitor environmental conditions of the at least one packaged article. The method employs a packaging system as described herein where at least one operational characteristic of the NFC/RFID circuit is dependent on change in impedance between the first and second conductive layers of the multilayer laminate structure in response to an intrusion or perforation produced by the at least one sensor in response to predetermined environmental conditions. The method includes employing an NFC/RFID interrogator to ascertain the operational characteristic of the NFC/RFID circuit to detect an intrusion or perforation produced by the at least one sensor in response to predetermined environmental conditions, and output an indication (e.g., visual or audible notification) of the predetermined environmental conditions that caused the perforation if and when detected. The NFC/RFID circuit and NFC/RFID interrogator can cooperate to read other information that is related to the packaged article(s) and stored by the NFC/RFID circuit, such as ingredient information (e.g., source and date of extraction), manufacturing information (such as Plant Number and Lot number), quality control information, product identifier(s), shipping information, and other arbitrary information.

The packaging system and associated method can be used to monitor environmental conditions for a wide range of packaged articles, including but not limited to the following:

medicine
   foods or beverages
   chemicals
   forensics samples
   electronics
   electro-mechanical products
   branded products
   lifestyle personal products
   documents or works of art
   plastics or rubbers
   fabrics or leather goods
   wood
   combinations of these products or other products thereof The packaging system and method can be used to monitor environmental conditions of one or more packaged article(s) over time (e.g., as the article is exchanged along a supply chain). The supply chain can include ingredient information (e.g., source and date of extraction), manufacturing information (such as Plant Number and Lot number), quality control information, product identifier(s), warehousing, shipping/distribution information (for an origin to destination with intermediate locations there between), information related to point of sale including online shopping, retail stores, shops, terminals, and other arbitrary points along the supply chain.

DETAILED DESCRIPTION OF THE PREFERRED EMBODIMENTS

The term "relatively high impedance electrical current path" and "relatively low impedance electrical current path" are relative terms, where the "relatively high impedance electrical current path" has an impedance that is significantly larger than the "relatively low impedance electrical current path"; in embodiments, the "relatively high impedance electrical current path" can have an impedance that is at least 1,000 times that of the "relatively low impedance electrical current path"; in other embodiments, the "relatively high impedance electrical current path" can have an impedance that at least 10,000 times that of the "relatively low impedance electrical current path"; and in still other embodiments, the "relatively high impedance electrical current path" can have an impedance that at least 100,000 times that of the "relatively low impedance electrical current path."

The present disclosure includes a packaging system for at least article or item, which includes a multilayer laminate structure that includes an encapsulated transformative material that is disposed between first and second conductive layers. The transformative material is configured to undergo a state change (for example, by a chemical reaction or physical change) that changes impedance between the first and second conductive layers in response to a perforation through at least part of the multilayer laminate structure. The perforation is made by a sensor that is disposed adjacent to or on the multilayer laminate structure and that is exposed to the space occupied by the at least one article. The sensor includes a spring-activated perforating member that is deployed under predetermined environmental conditions (such as certain predetermined temperature conditions or certain predetermined humidity conditions) in the space occupied by the at least one article, where such deployment forms the perforation through at least part of the multilayer laminate structure. An NFC/RFID circuit is electrically coupled to the first and second conductive layers of the multilayer laminate structure. At least one operational characteristic of the NFC/RFID circuit is dependent on the change in impedance between the first and second conductive layers of the multilayer laminate structure as provided by the transformative material in response to the perforation produced by the sensor under the predetermined environmental conditions. The operational characteristic of the NFC/RFID circuit can be ascertained and analyzed (for example, by suitable operations of an external NFC/RFID interrogator) to detect and register the perforation and provide an indication of the environmental condition that caused the perforation if and when detected.

Figure 1A:
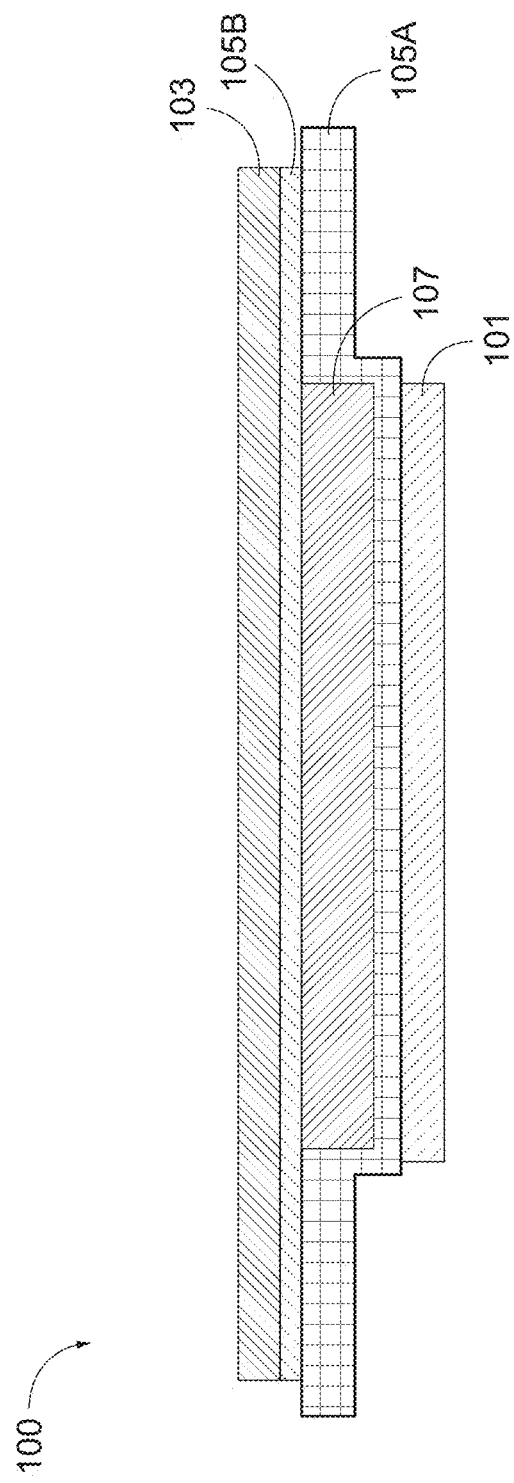
FIG. 1A is a schematic cross-sectional view of an exemplary multilayer laminate structure that can be used in packaging systems according to the present disclosure.
Figure 1B:
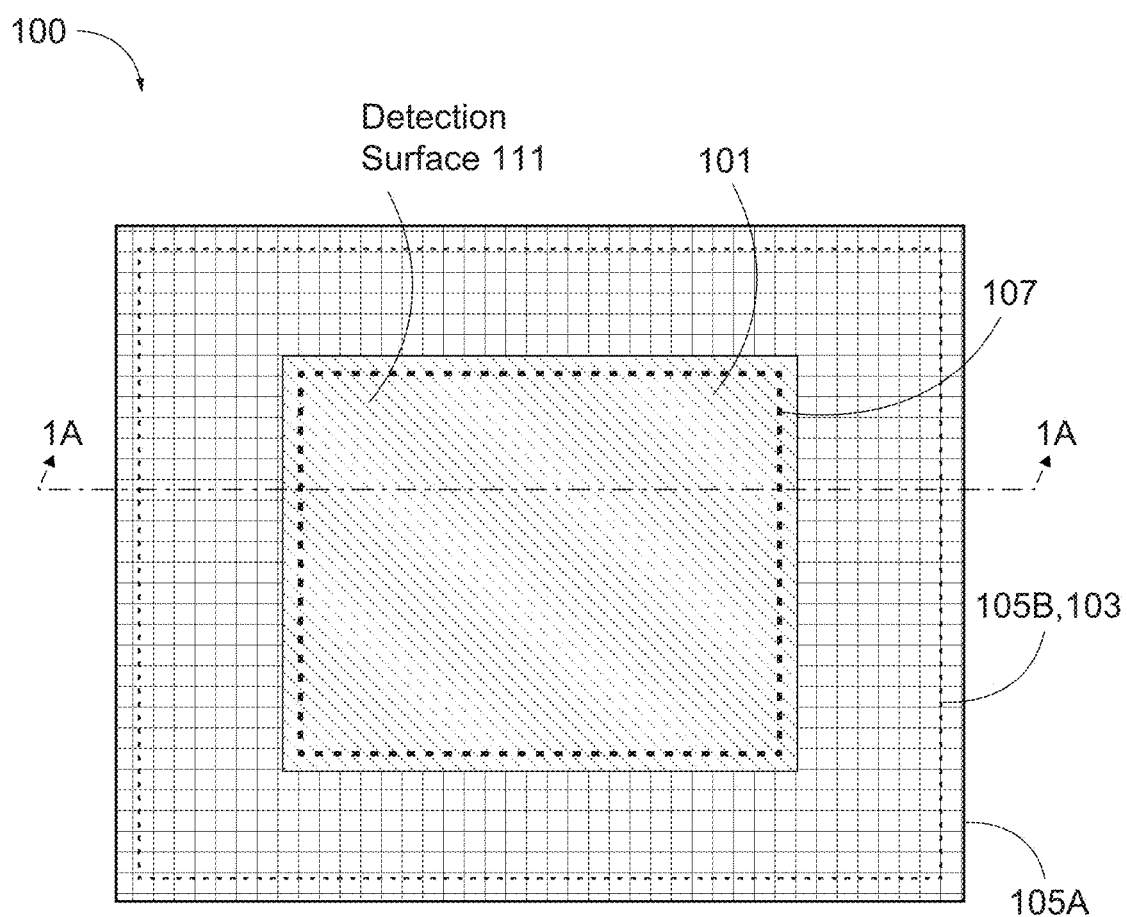
FIG. 1B is a schematic bottom view of the multilayer laminate structure of FIG. 1A.
Figure 1C:
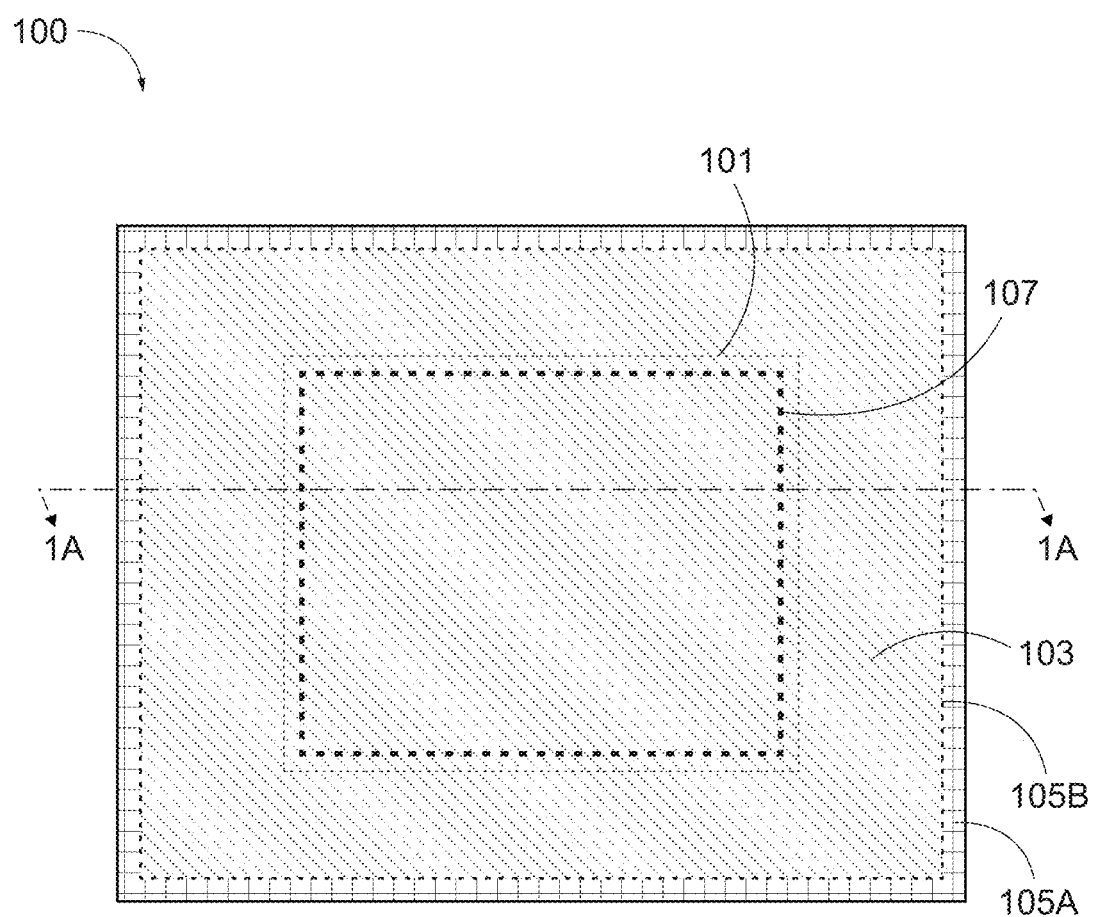
FIG. 1C is a schematic top view of the multilayer laminate structure of FIG. 1A.

FIGS. 1A, 1B and 1C show an example flexible multilayer laminate structure 100 that can be used to form the packaging system, which includes a first conductive layer 101, a second conductive layer 103, and intermediate layers 105A and 105B that encapsulate transformative material 107 disposed between the first and second conductive layers 101, 103. The layers may be thin flexible sheets such that the multilayer laminate structure 100 is flexible in nature and thus is able to bend or fold. In embodiments, the multilayer laminate structure 100 can be formed by suitable printing technologies, such as continuous gravure or rolled based printing (including roll-to-roll printing), stamp printing or inkjet printing. Various microprinting technologies can also be used if desired.

The transformative material 107 may include, for instance, a metal ion solution such as silver nitrate gel solution with silver ions that precipitate as solid-phase silver by a galvanic displacement reaction with certain noble metals. The first and second conductive layers 101 and 103 can be formed from a conductive material (e.g., a noble metal such as copper, magnesium, zinc, or tin) that undergoes a galvanic displacement reaction with a transformative material, such as for instance, silver ions of a silver nitrate gel solution 107 to precipitate solid-phase silver from the silver nitrate gel solution. Other metal ion solutions can be paired with other noble metals that support the galvanic displacement reaction with the metal ion solution and precipitates solid-phase metal from the solution. The intermediate layer 105A can be formed from a thin film of a conductive material (such as a conductive polymer). The intermediate layer 105B can be formed from a thin film of electrically-insulating material such as polyethylene terephthalate (PETG), photo-resistant polymer, Mylar, a spun polymer with a metallic oxide coating, or other encapsulating or insulating material. Alternately, the intermediate layer 105B can be formed from a hard electrically-insulating material, such as a hard polymer film of Kapton and/or Mylar and/or BoPET or another hard polymer than can be spin-coated or dip coated. The hardness of the polymer film can be in the range of shore 40D to shore 80D or higher. The thickness of the polymer film can range from 5 microns to 20 microns. Alternately, the intermediate layer 105B can be formed from a hard thin-film electrically-insulating ceramic material, such as silicon oxide, aluminum oxide, silicon nitride, titanium nitride, titanium oxide, zirconium tetrafluoride and combinations thereof. The hardness of the thin-film ceramic material can be in the range of shore 40D to shore 80D or higher. The thickness of the thin-film ceramic material can range from 0.1 microns to 1 micron. Alternatively, the intermediate layer 105B can be formed from a thin film of conductive material (such as the same or different conductive polymer as that of 105A). The intermediate layers 105A and 105B encapsulate the transformative material (silver nitrate gel solution) 107 between the first and second conductive layers 101, 103 as shown. The intermediate layer 105A can extend laterally beyond the intermediate layer 105B and the second conductive layer 103 as shown. The first conductive layer 101 can cover the transformative material 107 as shown and is typically positioned facing the package product and closest to the packaged product, while the second conductive layer 103 is typically positioned facing away from the package product and furthest from the packaged product.

Note that in this configuration the conductive material of the intermediate layer 105A can be selected such that it does not undergo a galvanic displacement reaction with the silver metal ion solution (e.g., the silver nitrate gel solution that precipitates solid-phase silver). In this configuration, the metal(s) of the first conductive layer 101 would undergo a galvanic displacement reaction with metal ions of the metal ion solution if in contact with the metal ion solution, but it is inhibited from doing so by the intervening intermediate layer 105A. Furthermore, the material of the intermediate layer 105B can be selected such that it does not undergo a galvanic displacement reaction with the metal ion solution that precipitates the solid-phase metal. In this configuration, the metal(s) of the second conductive layer 103 would undergo an irreversible galvanic displacement reaction with metal ions of the metal ion solution if in contact with the metal ion solution, but it is inhibited from doing so by the intervening intermediate layer 105B.

Figure 2A:
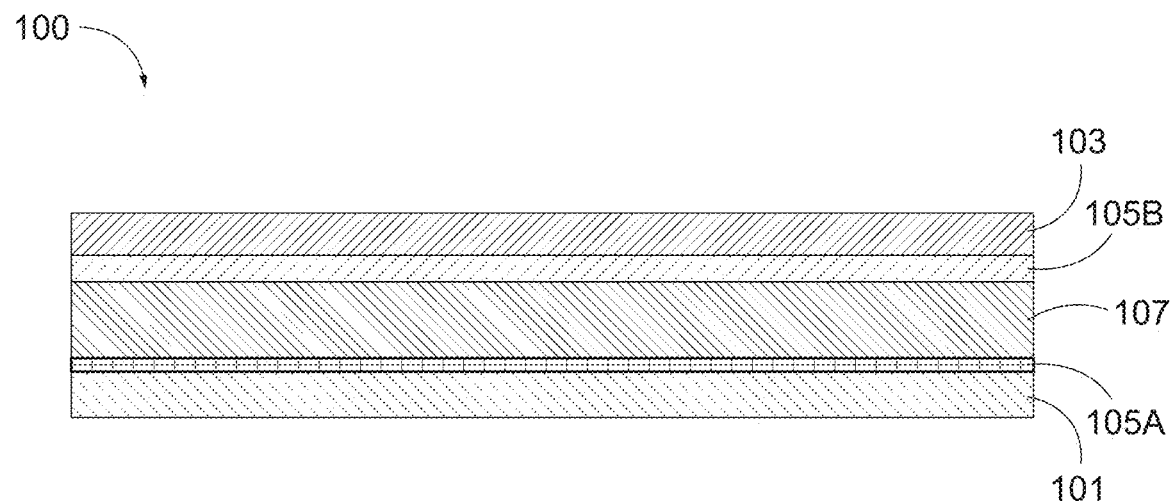
FIGS. 2A-2D are schematic views of an exemplary intrusion or perforation through the multilayer laminate structures of FIGS. 1A-C and the galvanic displacement reaction and resulting structural and electrical changes to the multilayer laminate structure that result from such intrusion.

Note that under normal conditions absent an intrusion or perforation, the multilayer laminate structure 100 has a configuration that provides a relatively high impedance electrical current path between the first and second conductive layers 101 and 103 as shown in FIG. 2A. However, in response to an intrusion or perforation, the multilayer laminate structure 100 automatically reconfigures itself to a different configuration where metal ions of the metal ion solution (e.g., silver ions of a silver nitrate gel solution) precipitate to form solid-phase metal (e.g., silver) that provides part or all of a relatively low impedance electrical current path between the first and second conductive layers 101 and 103 as shown in FIGS. 2B to 2D.

Figure 2B:
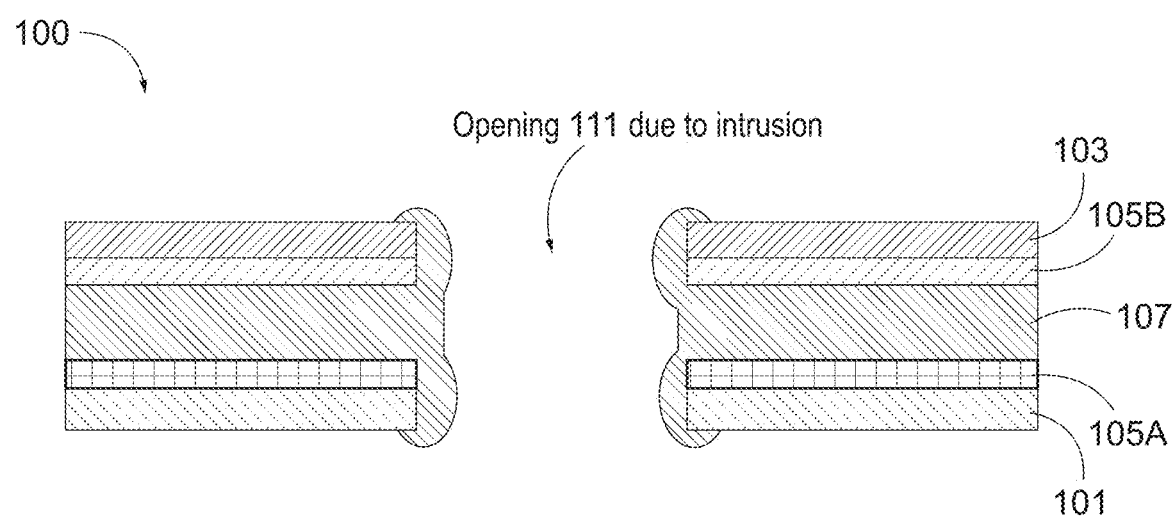
Figure 2C:
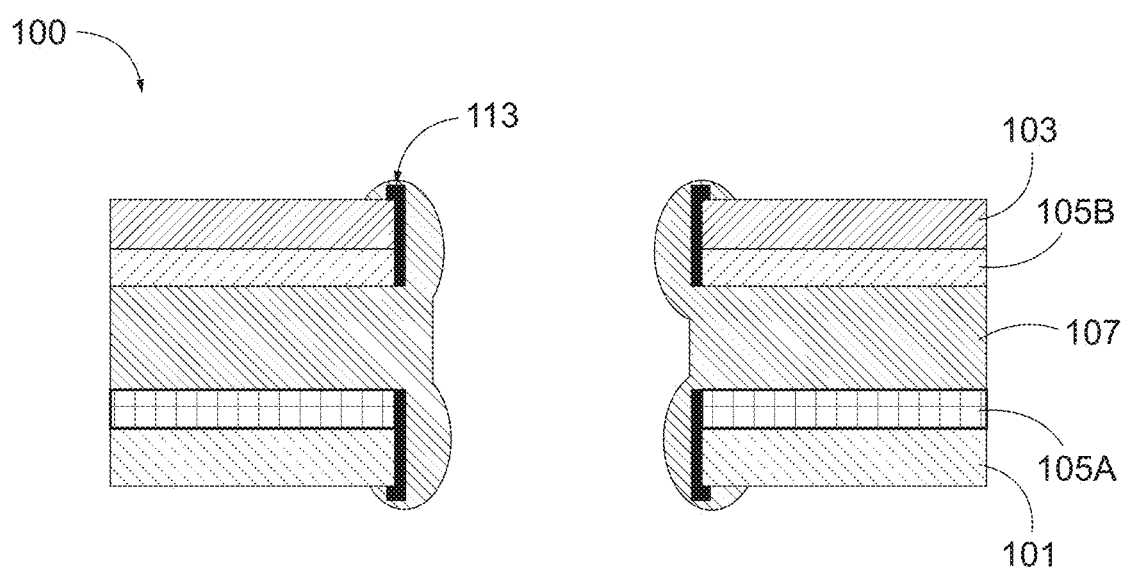

More specifically, an intrusion or perforation can form an opening 111 that extends completely through the first and second conductive layers 101, 103 of the multilayer laminate structure as shown in FIG. 2B. In response to such intrusion or perforation, the metal ion solution (e.g., silver nitrate gel solution) can be displaced (or flow) through this opening 111 and contact both the first and second conductive layers 101, 103 as shown. The metal ion solution (e.g., silver nitrate gel solution) by itself is conductive. Thus, if sufficient metal ion solution is present in the space between the first and second conductive layers 101 and 103, the initial displacement (flow) of the metal ion solution (e.g., silver nitrate gel solution) can form all or part of a low impedance current path between the first and second conductive layers 101 and 103.

Furthermore, with the metal ion solution (e.g., silver nitrate gel solution) in contact with the appropriate metal(s) of the first and second conductive layers 101 and 103, the metal ion solution (e.g., silver nitrate gel solution) can undergo a galvanic displacement reaction that precipitates solid-phase metal (e.g., silver) in response to the intrusion. The solid-phase metal (e.g., silver) precipitate can extend from the second conductive layer 103 through the adjacent intermediate layer 105B as shown in FIG. 2C. The metal ion solution 107 by itself is conductive. Thus, if sufficient metal ion solution 107 (e.g., silver nitrate gel solution) is present in the space between the deposited solid-phase metal (e.g., silver) and the intermediate layer 105A or the first conductive layer 101, the solid-phase metal precipitate (e.g., silver) in conjunction with the metal ion solution (e.g., silver nitrate gel solution) can form all or part of a relatively low impedance electrical current path between the first and second conductive layers 101 and 103.

Figure 2D:
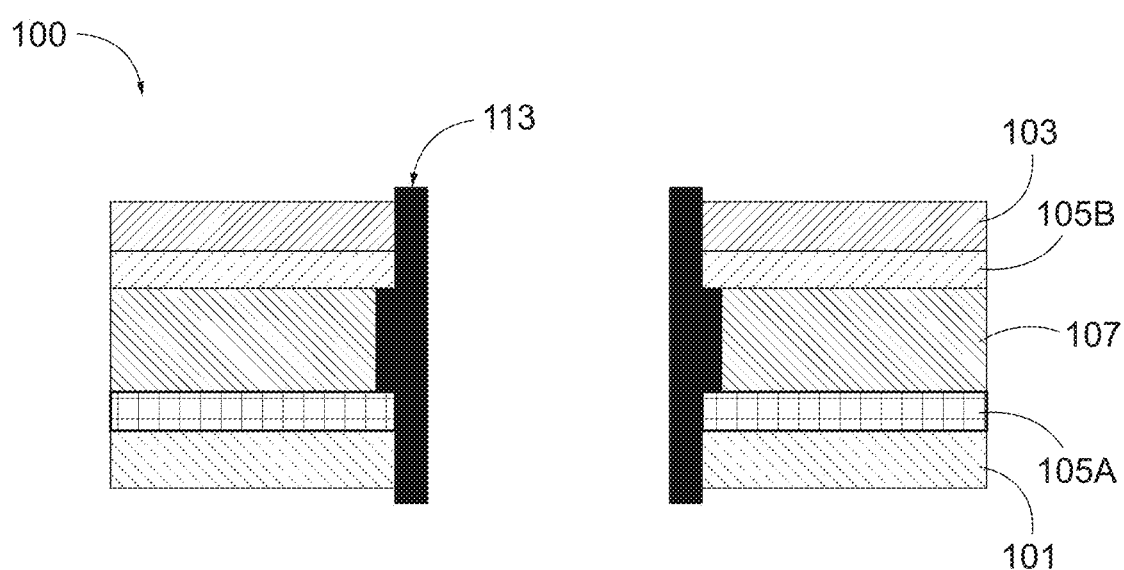

Moreover, the precipitation of the solid-phase metal (e.g., silver) can continue such that the solid-phase metal precipitate extends between first and second conductive layers 101 and 103 as shown in FIG. 2D. In this manner, the solid-phase metal precipitate alone (e.g., silver), without any conductive metal ion solution (e.g., silver nitrate gel solution), can form all or part of a relatively low impedance electrical current path between the first and second conductive layers 101 and 103.

In this manner, the multilayer laminate structure 100 can function under normal conditions as a flexible two-plate capacitor with the first and second conductive layers equivalent to the two plates of the capacitor, and the encapsulated metal ion solution 107 equivalent to the dielectric medium between the two plates. As a two-plate capacitor, the multilayer laminate structure 1000 provides a relatively high impedance electrical current path between the first and second conductive layers 101 and 103. In response to the intrusion or perforation, the metal ion solution can flow or undergo a galvanic reaction that provides part or all of a relatively low impedance electrical current path between the first and second conductive layers 101 and 103.

Figure 3:
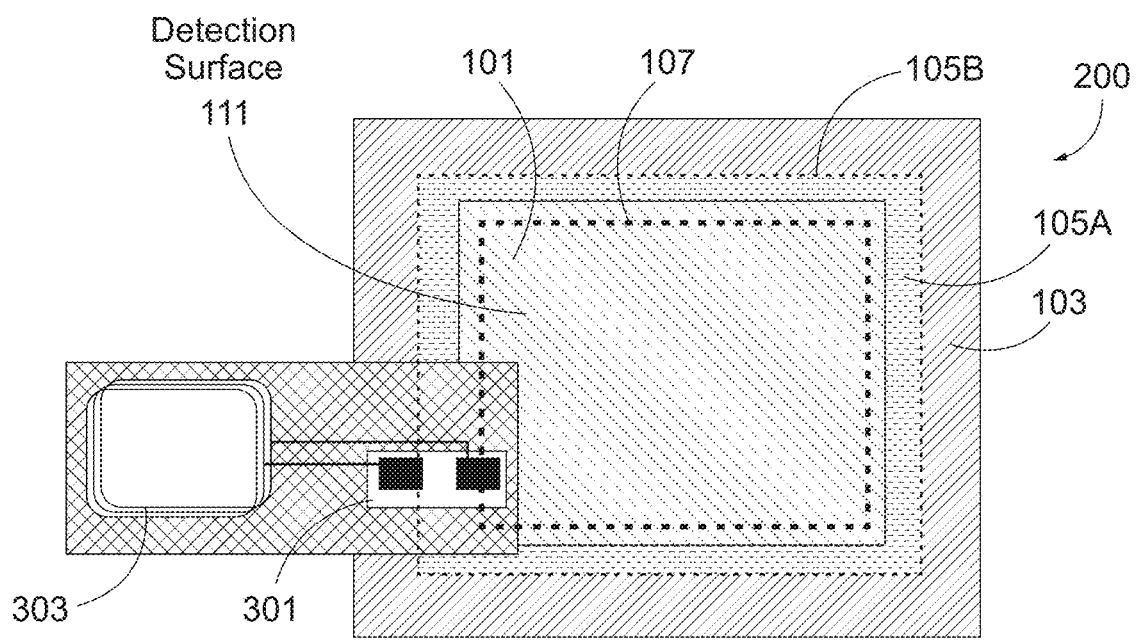
FIG. 3 is a schematic top view of an example packaging system that employs the multilayer laminate structure of FIGS. 1A-1C together with an NFC/RFID circuit and coil antenna.

FIG. 3 is a schematic diagram that illustrates an exemplary embodiment where the multilayer laminate structure of FIGS. 1A to 1C is folded about four opposite edges such that second conductive layer 103 surrounds the perimeter of resulting structure 200 with a portion that faces the same direction as the first conductive layer 101. The exposed portion of the first conductive layer 101 provides a detection surface 111 as shown. In this configuration, a sub-assembly or tag 300 that includes an NFC/RFID circuit 301 and two-terminal coil antenna 303 (e.g., a copper trace antenna) can be mounted or otherwise supported on the multilayer laminate structure 200, particularly on the first conductive layer 101 and the portion of second conductive layer 103 that faces the same direction as the first conductive layer 101 as shown. The NFC/RFID circuit 301 and the two-terminal coil antenna 303 (e.g., a copper trace antenna) can be mounted or otherwise supported on the multilayer laminate structure 200 by suitable interconnect structures (such as ball-type interconnects). In embodiments, the tag 300 can include a flexible substrate with the coil antenna 303 printed or otherwise supported on the flexible substrate. The NFC/RFID circuit 301 can also be supported by the flexible substrate. Although any number of materials may be used for the flexible substrate, the flexible substrate may be a flexible polyethylene terephthalate (PETG) film.

The NFC/RFID circuit 301 includes two coil input terminals that are electrically connected to the two terminals of the coil antenna 303. The NFC/RFID circuit 301 can cooperate with the coil antenna 303 to exchange data with an external NFC/RFID interrogator using radio frequency (RF) signals as is well known. The NFC/RFID circuit 301 is a passive-type NFC/RFID device which does not contain a battery, but instead includes power management circuitry that harvests and stores electrical power from the radio signals that are transmitted by the NFC/RFID interrogator and received by the coil antenna 303. Such electrical power can be regulated to one or more predefined voltage levels and supplied to the circuit elements of the NFC/RFID circuit 301 for activation of the circuit elements. The circuit elements typically include modulator/demodulator circuitry that demodulates the radio signals that are transmitted by the NFC/RFID interrogator and received by the antenna circuitry and that modulates radio signals that are transmitted by the antenna to the NFC/RFID interrogator, and a controller and non-volatile memory for processing and storing data.

In the embodiment of FIG. 3, under normal conditions absent an intrusion or perforation, the multilayer laminate structure 200 provides a relatively high impedance electrical current path between the first and second conductive layers 101 and 103 and between the two antenna terminals electrically coupled thereto. The relatively high impedance current path between the two antenna terminals allows the NFC/RFID circuit 301 to harvest power from the electromagnetic radiation provided by an external NFC/RFID interrogator and use such harvested power as supply to the electrical components of the NFC/RFID circuit 301 for its operations. In response to an intrusion or perforation, the transformative material 107 of the folded multilayer laminate structure 200 can adapt to provide all or part of a relatively low impedance electrical current path between the first and second conductive layers 101 and 103 and between the two antenna terminals electrically coupled thereto. Such relatively low impedance electrical current path automatically configures the NFC/RFID circuit 301 to remain in a power-off state in the presence of electromagnetic radiation that is normally sufficient to provide electrical power to the NFC/RFID circuit 301. In this manner, if the NFC/RFID circuit 301 remains in a power-off state in the presence of electromagnetic radiation provided by an external NFC/RFID interrogator that is normally sufficient to provide electrical power to the NFC/RFID circuit 301, the external NFC/RFID interrogator 301 can sense this power-off state, interpret this power-off state as a signal of the intrusion, and output an indication (e.g., visual or audible notification) of the intrusion or perforation if and when detected.

For example, in one case for purposes of illustration, the relatively high impedance electrical current path can be on the order of 10 megaohms and the relatively low impedance current path can be on the order of 100 ohms to 1 ohms such that the relatively high impedance electrical current path" is on order of $10^5$ to $10^6$ times larger than the relatively low impedance electrical current path. Other configurations can be implemented where the relatively high impedance electrical current path is less than or more than these values and where the relatively low impedance current path is less than or more than these values.

Figure 4A:
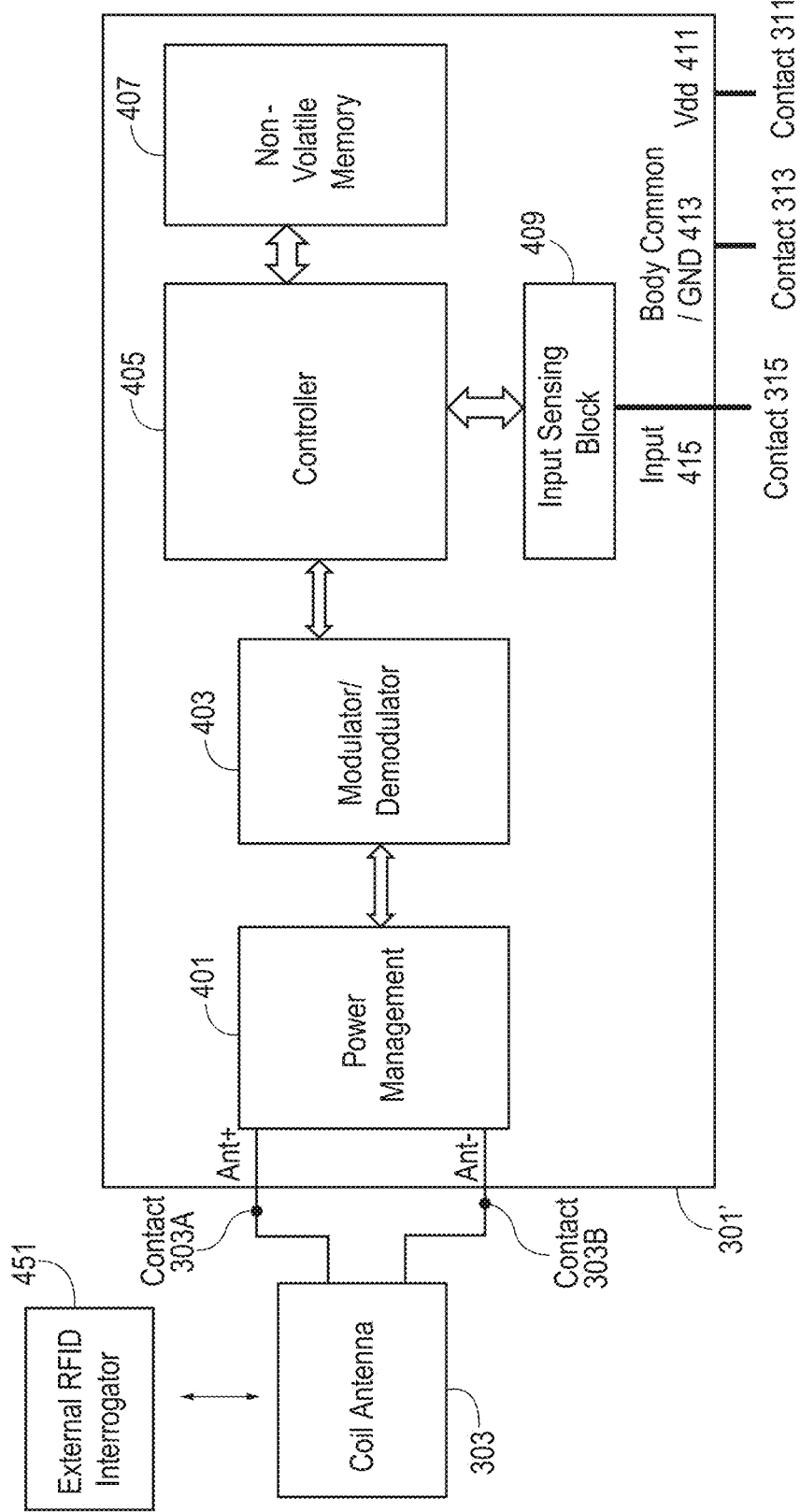
FIG. 4A is a functional block diagram of an NFC/RFID circuit and coil antenna with electrical interconnection between terminals of the NFC/RFID circuit and the multilayer laminate structure of the packaging system of FIGS. 5A-5I.
Figure 4B:
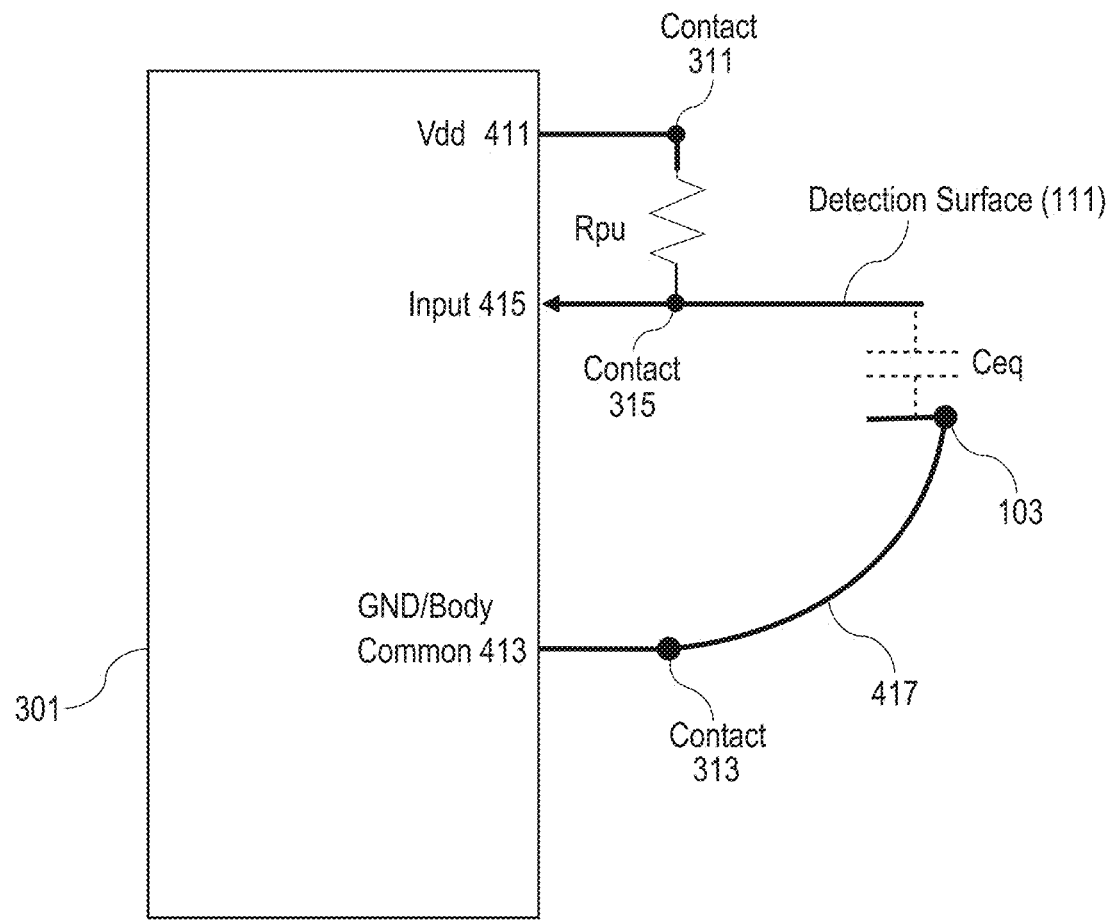
FIG. 4B is a functional block diagram showing electrical interconnection between certain terminals of the NFC/RFID circuit and the multilayer laminate structure of the packaging system of FIGS. 5A-5I.

In an embodiment shown in FIG. 4A, a passive-type NFC/RFID circuit 301' is provided that includes two coil input terminals (Ant+, Ant−), a Vdd terminal 411, a GND or Body Common terminal 413, and an input terminal 415. Similar to the embodiment of FIG. 3, the two coil input terminals (Ant+, Ant−) of the NFC/RFID circuit 301' are electrically interconnected to two antenna contacts 303A, 303B of the coil antenna 303 by a suitable interconnect structure (such as ball-type interconnect). The other terminals of the NFC/RFID circuit 301' are connected to different parts of the multilayer laminate structure and other circuit components as follows. First, the input terminal 415 is electrically interconnected to a contact 315 formed by a patterned conductive layer 101 by a suitable interconnect structure (such as ball-type structure), which provides electrical connection between the input terminal 415 and the detection surface 111 formed by the patterned conductive layer 101. Second, the Vdd terminal 411 is electrically interconnected to a contact 311 formed by the patterned conductive layer 101 by a suitable interconnect structure (such as ball-type structure). A pull-up resistor $R_{pu}$ is electrically connected between contact 311 and contact 313 formed by the patterned conductive layer 101 such that the pull-up resistor $R_{pu}$ is electrically connected between the Vdd terminal 411 and the input terminal 415 as shown in FIG. 4B. The pull-up resistor $R_{pu}$ can be interconnected to the contacts 311, 313 or terminals 411, 415 by conductive traces (e.g., layer 101) or by soldered insulating wires or other suitable means. Finally, the GND or Body Common terminal 413 is electrically interconnected to a contact 313 formed by the patterned conductive layer 101 by a suitable interconnect structure (such as ball-type structure). A connector 417, which can be a soldered insulating wire or other suitable means, provides electrical connection between the contact 311 and the second conductive layer 103, and thus provides electrical connection between the GND or Body Common terminal 413 and the second conductive layer 103.

The NFC/RFID circuit 301' can cooperate with the coil antenna 303 to exchange data with an external NFC/RFID interrogator 451 using radio frequency (RF) signals as is well known. The NFC/RFID circuit 301' is a passive-type NFC/RFID device which does not contain a battery, but instead includes power management circuitry 401 that harvests and stores electrical power from the radio signals that are transmitted by the NFC/RFID interrogator and received by the coil antenna 303. Such electrical power can be regulated to one or more predefined voltage levels and supplied to the circuit elements of the NFC/RFID circuit 301' for activation of the circuit elements. The circuit elements can include modulator/demodulator circuitry 403 that demodulates the radio signals that are transmitted by the NFC/RFID interrogator 451 and received by the coil antenna 303 and that modulates radio signals that are transmitted by the coil antenna 303 to the NFC/RFID interrogator 451, a controller 405 and non-volatile memory 407 for processing and storing data, and an input sensing block 409 that is configured to receive an electrical signal supplied by the input terminal 415 for processing and storage as data by the controller 405. The Vdd terminal 411 outputs a positive voltage supply signal that is generated from the electrical energy harvested and stored by the power management circuitry 401. The GND or Common Body terminal 413 provides an external ground or common body reference potential signal.

In embodiments, the NFC/RFID circuit 301' can be an integrated circuit package that is fabricated using semiconductor manufacturing processes. For example, the NFC/RFID circuit 301' can be realized by commercially-available NFC/RFID circuits, such as the UCODE G2iM+ NFC IC sold commercially by NXP Semiconductors N.V or the SIC4310 NFC IC sold commercially by Silicon Craft Technology. Other suitable NFC/RFID circuits can also be used. The RF signals communicated between the NFC/RFID circuit 301' and the NFC/RFID interrogator 451 can conform to one or more standards. For example, ISO/IEC 14443, ISO/IEC 15693, ISO/IEC 118000 and EPC Global UHF Class 1 Generation 2 are common standards supported by NFC/RFID circuits and NFC/RFID interrogators.

In the embodiment shown in FIG. 4B, the detection surface 111 is electrically coupled to a corresponding input terminal 415 of the NFC/RFID circuit 301'. Under normal conditions absent an intrusion or perforation in the detection surface 111, the multilayer laminate structure provides an effective capacitance $C_{eq}$ (a relatively high impedance electrical current path) between the detection surface 111 and the second conductive surface 103. When an intrusion or perforation occurs in the detection surface 111, the transformative material 107 of the multilayer laminate structure can adapt to provide all or part of a relatively low impedance electrical current path between the detection surface 111 and the other conductive layer 103. Specifically, the capacitance $C_{eq}$ is transformed to a low-resistance $R_{eq}$. Thus, the voltage signal at the input terminal 915 becomes $Vdd*R_{eq}/(R_{pu}+R_{eq})$, where $R_{pu}$ is the resistance of the pull-up resistor $R_{pu}$. By choosing the appropriate $R_{pu}$, the voltage signal at the input terminal 415 sensed for an intrusion or perforation will be less than a predefined threshold voltage.

By sensing that the voltage signal at the input terminal 415 is less than the predefined threshold voltage for intrusion or perforation, the input sensing block 409 can generate a corresponding digital value representing the detected intrusion or perforation event, which can be stored in a register as part of the input sensing block 409 of the NFC/RFID circuit 301'.

In response to one or more commands issued by the external NFC/RFID interrogator 451, the input sensing block 409 of the NFC/RFID circuit 301' can be configured to sense and detect the voltage signal at the input terminal 415 and generate and register or store a corresponding digital value (data) representing a detected intrusion or perforation event when the voltage signal at the input terminal 415 is less than the predefined threshold voltage for intrusion or perforation. Furthermore, the controller 405 of the NFC/RFID circuit 301' can be further configured to communicate the data representing the detected intrusion or perforation event to the external NFC/RFID interrogator 451. The external NFC/RFID interrogator 451 can analyze the data communicated from the NFC/RFID circuit 301' to interpret the data as a signal of the intrusion or perforation (for example, by comparing the data to the expected data value(s) representing an intrusion or non-intrusion event), and output an indication (e.g., visual or audible notification) of the intrusion or perforation if and when detected.

In embodiments, the packaging system as described herein (which includes a multilayer laminate structure with NFC/RFID circuit and coil antenna) can be used as a sensing barrier that protects the opening into a rigid closed-wall container (such as glass bottle) that houses at least one article. This is similar to embodiment shown in FIG. 8.

In embodiments, the transformative material of the multilayer laminate structure can include a metal ion solution (e.g., silver nitrate gel solution) that is displaced (or flows) or undergoes a galvanic displacement reaction that precipitates solid-phase metal (e.g., silver) in response to intrusion through the multilayer laminate structure, where the displacement or the precipitation of the solid-phase metal or both changes the impedance between the first and second conductive layers to form a relatively low impedance electrical current path between the first and second conductive layers of the multilayer laminate structure.

Figure 5A:
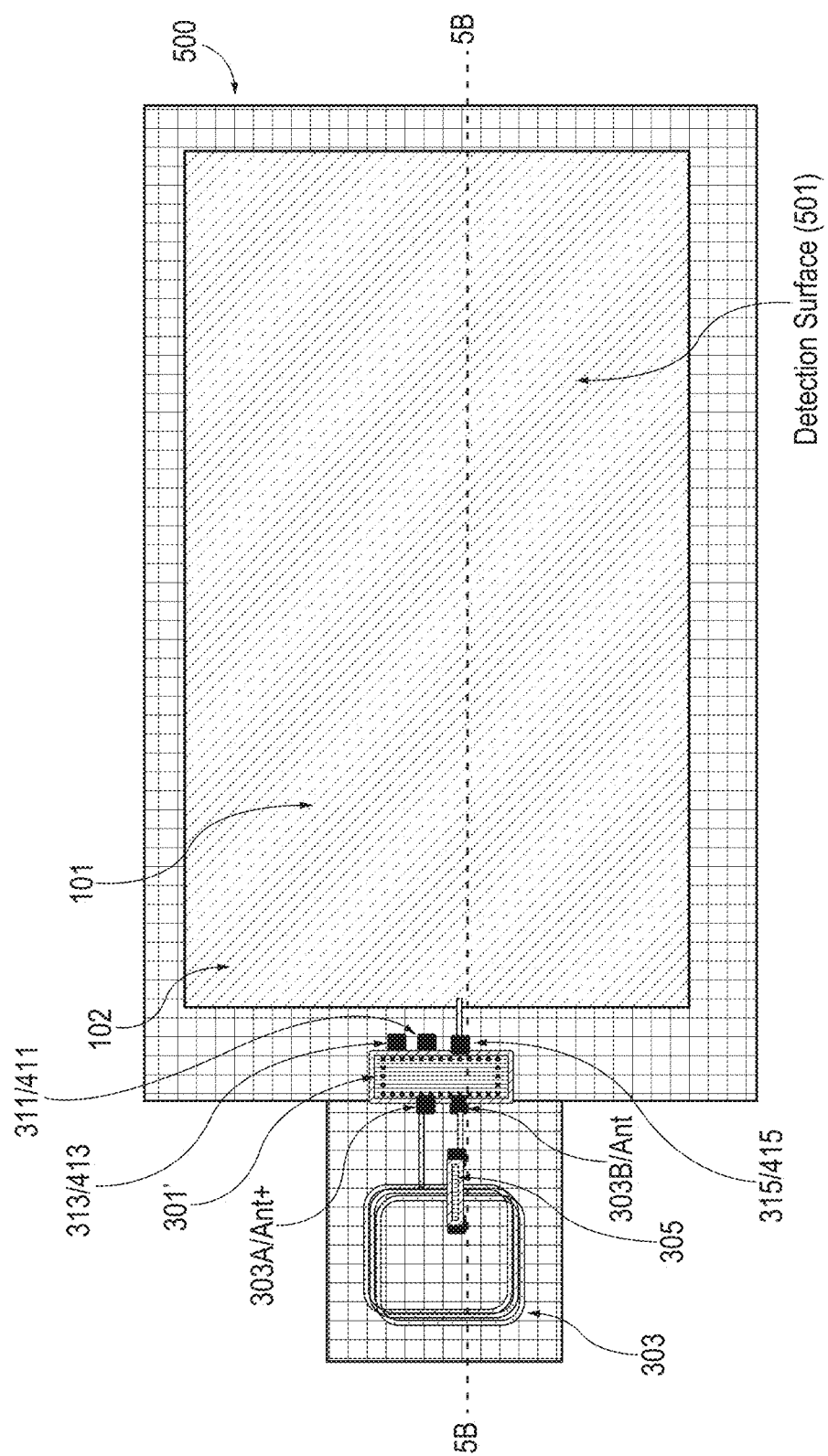
FIGS. 5A-5I are schematic diagrams that illustrate a method of forming a packaging system that includes a multilayer laminate structure with NFC/RFID circuit and coil antenna and sensor.
Figure 5B:
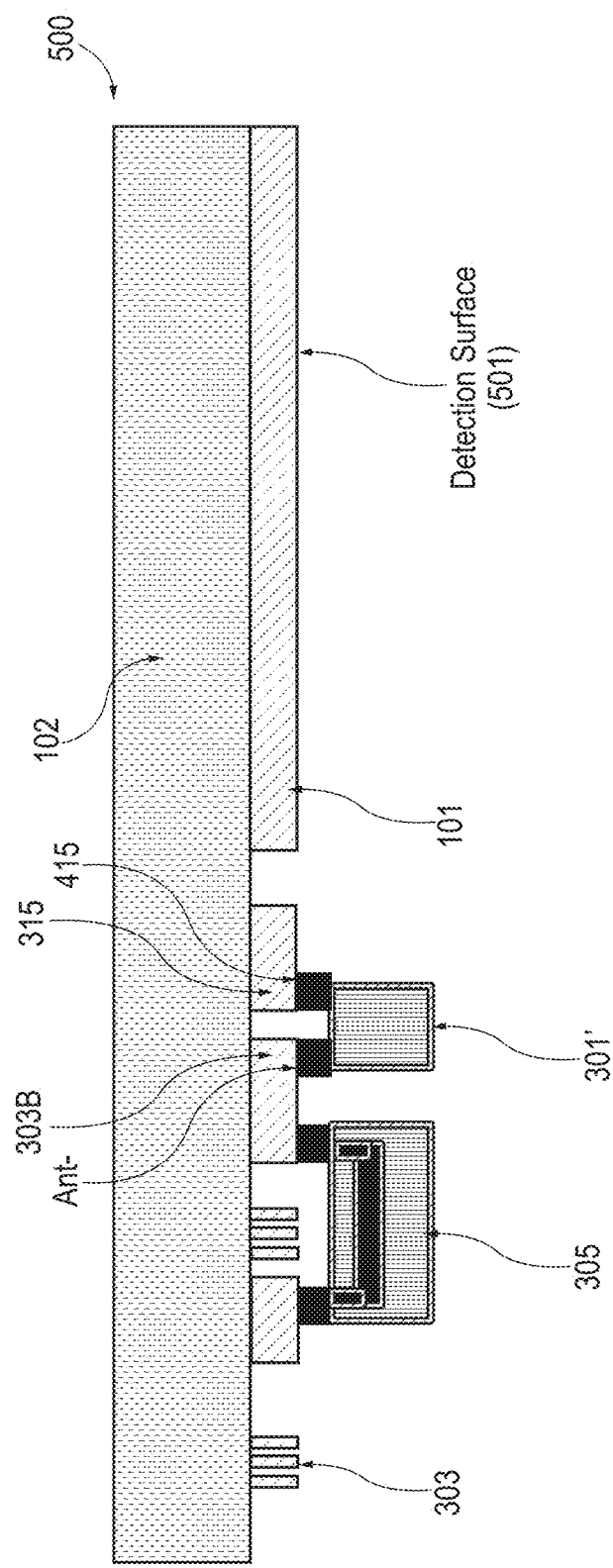

FIGS. 5A-5I illustrate a method of forming a packaging system that includes a multilayer laminate structure with NFC/RFID circuit and coil antenna and one or more sensors. In this method, the first conductive layer 101A is formed on a flexible electrically-insulating substrate 102 and patterned to define local features formed from the first conductive layer 101A. As best shown in FIGS. 5A and 5B, the local features can include one or more loops of the coil antenna 303, antenna contacts 303A, 303B and corresponding interconnects that support a jumper 305 over the loops of the coil antenna 303, an input contact 315 and interconnect that extends to a corresponding detection surface 501, a Vdd contact 311, and a ground or common body contact 313. In embodiments, the patterned first conductive layer 101A with such local features can be formed by suitable printing technologies, such as continuous gravure or rolled based printing (including roll-to-roll printing), stamp printing or inkjet printing. Various microprinting and/or etching technologies can also be used if desired. The NFC/RFID circuit 301 is then mounted or interconnected to the patterned conductive layer 101A using suitable interconnect structures (such as ball-type interconnects). In this configuration, the input contact 315, the two antenna contacts 303A and 303B, the Vdd contact 311, and the ground or common body contact 313 are configured to interconnect to corresponding terminals of the NFC/RFID circuit 301 (see FIGS. 4A and 4B).

Figure 5C:
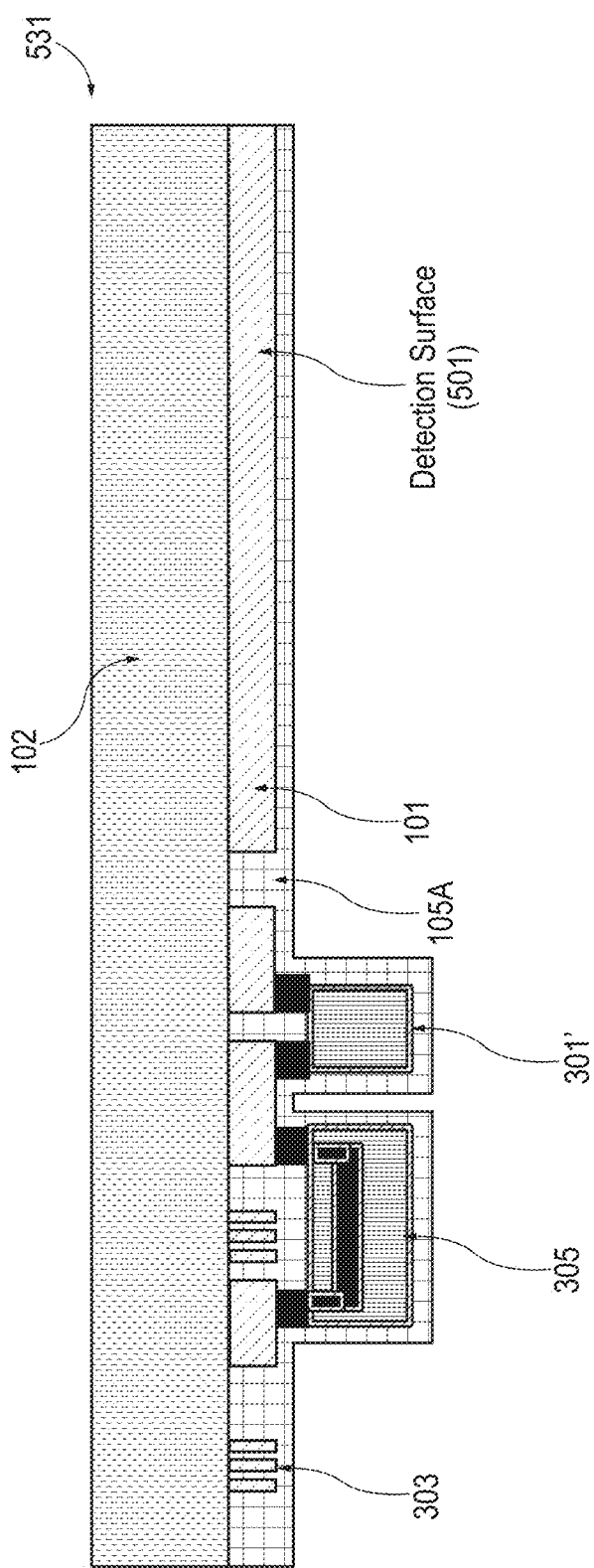

The patterned first conductive layer 101A with the NFC/RFID circuit 301 mounted and interconnected thereon is then covered by the electrically-insulating intermediate layer 105A to form a resultant structure 531 as shown in FIG. 5C. In embodiments, the intermediate layer 105A can be formed from a thin film of electrically-insulating material such as polyethylene terephthalate (PET), Polyethelene (PE), Polyimide (kapton), photo-resist polymer, Mylar, a spun polymer with a metallic oxide coating, or other suitable encapsulating or insulating material. The electrically-insulating intermediate layer 105A can be formed by spin coating or other suitable deposition techniques.

Figure 5D:
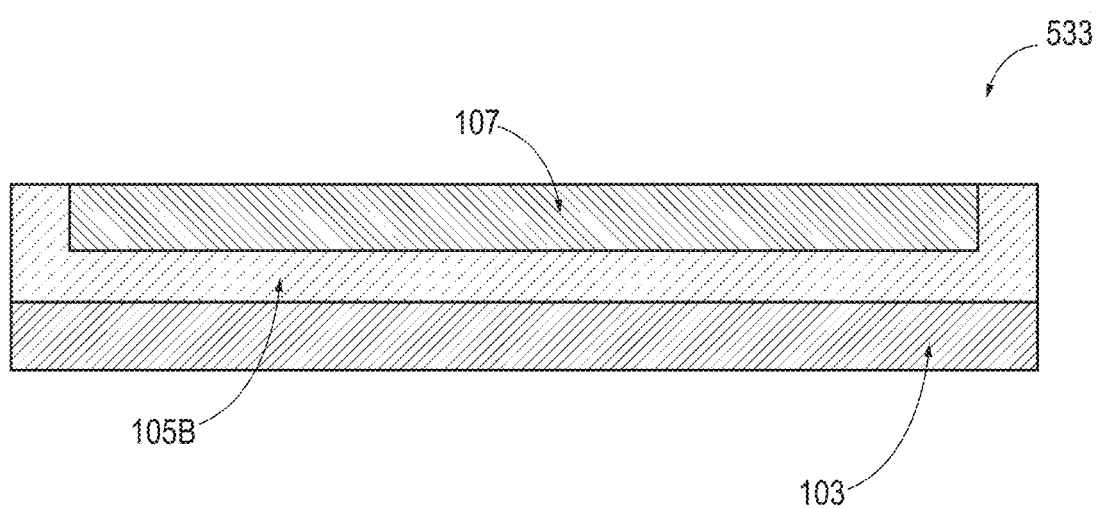

Separately, a multilayer structure 533 is formed that includes the transformative material 107, intermediate layer 105B and conductive layer 103 as shown in FIG. 5D. The multilayer structure 533 is similar to the multilayer laminate structure of FIGS. 1A-1C with the first conductive layer 101A and intermediate layer 105A removed. In embodiments, the multilayer structure 533 can be formed by suitable printing technologies, such as continuous gravure or rolled based printing (including roll-to-roll printing), stamp printing or inkjet printing. Various microprinting technologies can also be used if desired.

Figure 5E:
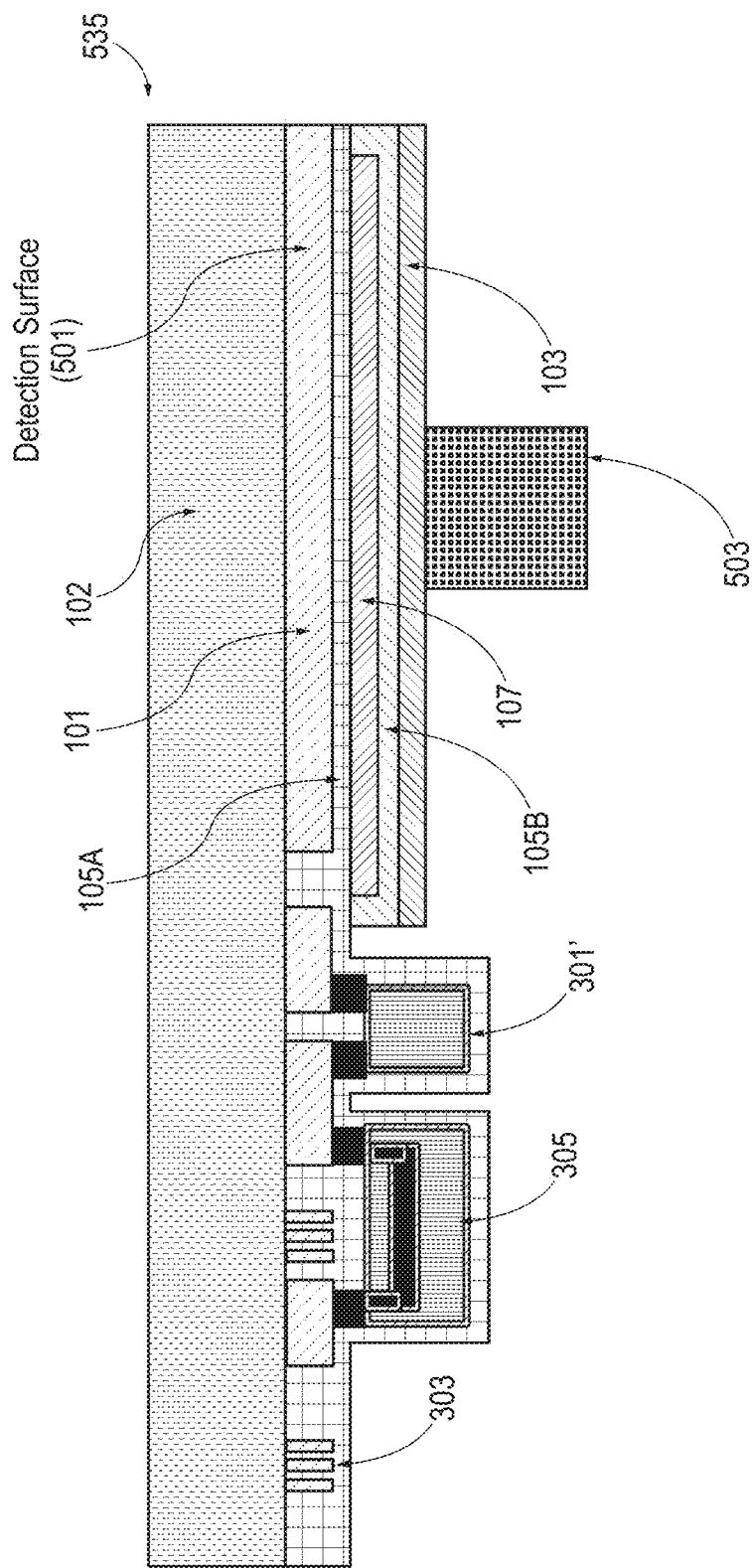

The multilayer structure 533 is then bonded (for example with a thin adhesive layer) or otherwise joined to the resultant structure 531 such that the transformative material 107 is encapsulated by the intermediate layers 105A, 105B in the area that underlies the detection surface 501 as shown in FIG. 5E. In this configuration, the transformative material 107 can be configured to change impedance between the detection surface 501 and the other conductive layer 103 in response to a perforation in the detection surface 501. The layers of the bonded laminate structure may be thin flexible sheets such that the bonded laminate structure is flexible in nature and thus is able to bend or fold.

In this embodiment, the area covered by the detection surface 501 can be configured such that the detection surface 501 encompasses a part, all or nearly all of the area of the barrier. A pull-up resistor $R_{pu}$ can be electrically coupled between the Vdd terminal 411 of the NFC/RFID circuit 103 and the corresponding detection surface 501 as shown in FIG. 4B. A connector 417, which can be a soldered insulating wire or other suitable means, can be electrically connected between the contact 311 and the second conductive layer 103 as shown in FIG. 4B. Note that the area covered by the detection surface 501 is generally rectangular in shape. However, in other embodiments, the area covered by the detection surface 501 can be any other arbitrary sharp, including linear shapes and non-linear shapes.

Figure 5F:
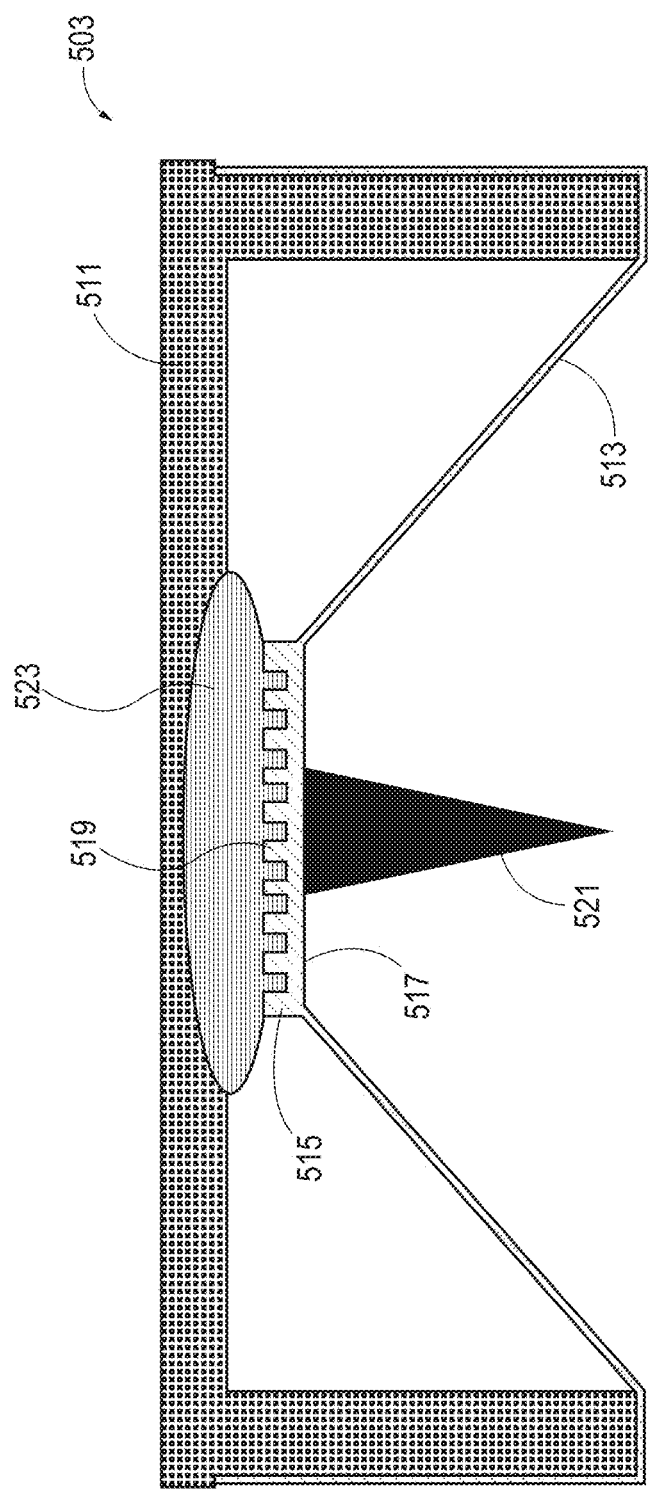
Figure 5G:
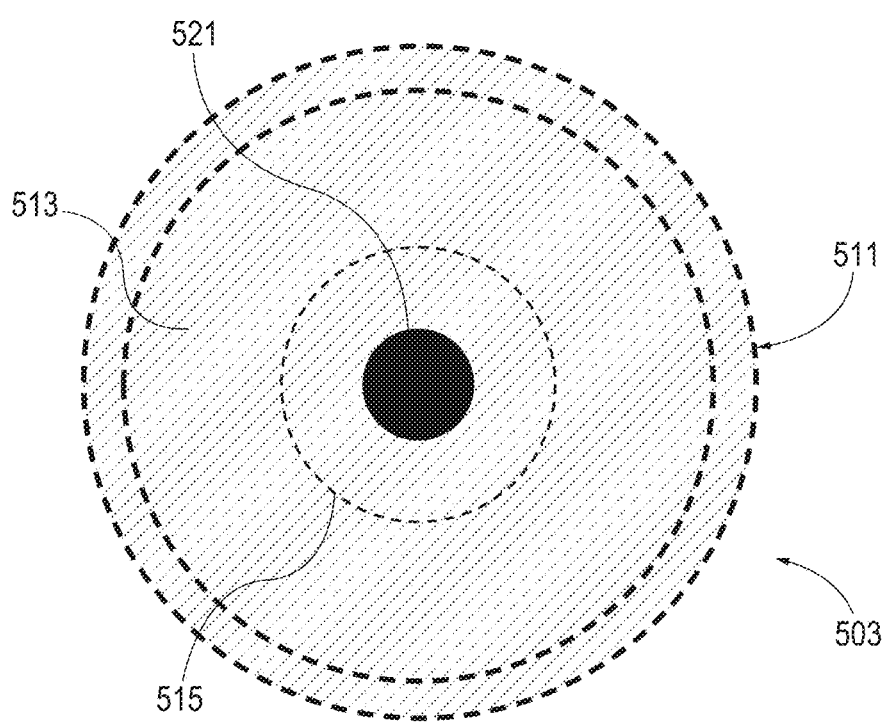
Figure 5H:
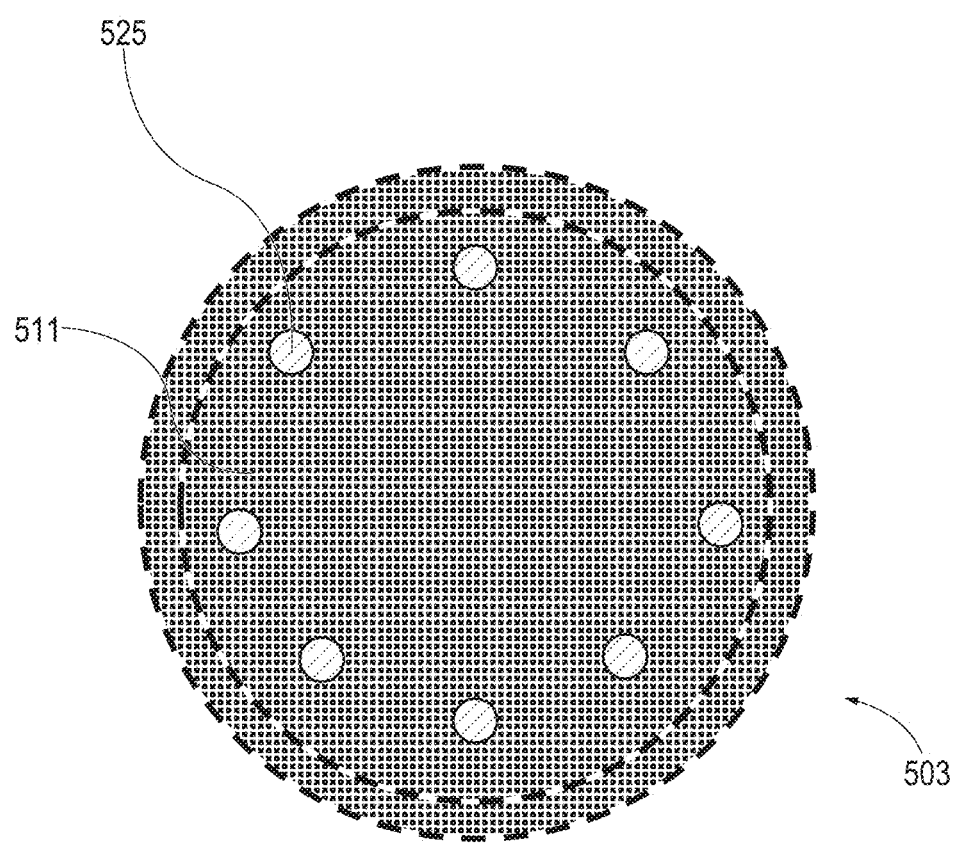
Figure 5I:
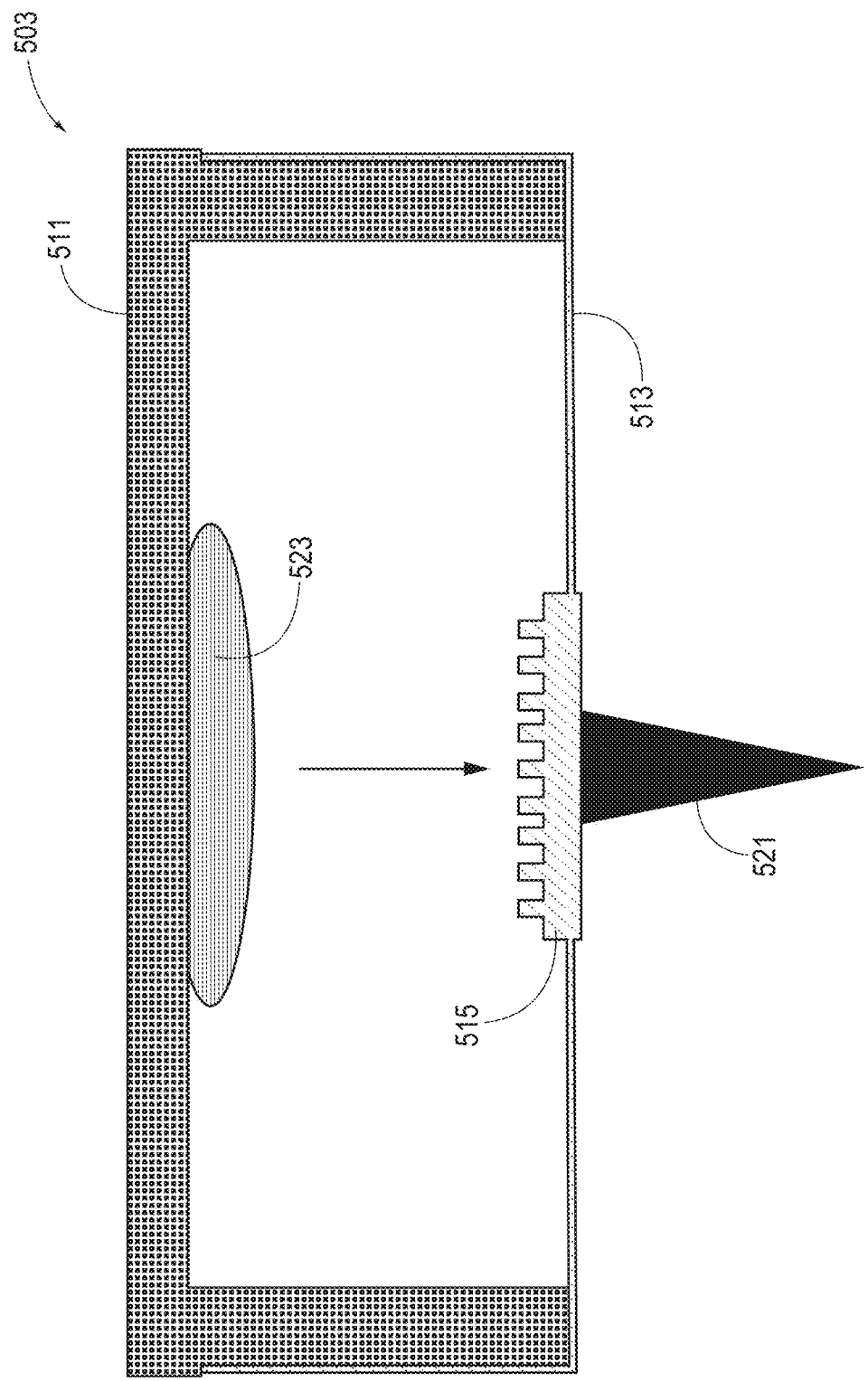

A spring-activated sensor 503 is bonded to (for example with a thin adhesive layer) or otherwise mounted adjacent to or on the conductive layer 103 opposite the detection surface 501 to provide a packaging system 535 as shown in FIG. 5E. The sensor 503 includes a housing 511 with a base and sidewalls that support an elastic spring diaphragm 513 as best shown in FIGS. 5F and 5G. In embodiments, the elastic spring diaphragm 513 can be formed from materials with good spring constants such as steel, aluminum, silicon and/or composites based on polymers and carbon fiber. In other embodiments, some other spring element (such as one or more elastic wires or coil) can be used as a substitute for the elastic spring diaphragm 513. The housing 511 has an open side (opposite the base) that faces the conductive layer 103. The central part of the diaphragm 513 supports a platform 515 onto which is mounted a spring-activated perforating member 521 as best shown in FIGS. 5F and 5G. The spring-activated perforating member 521 has a sharp distal tip that is configured to pierce or puncture the multilayer laminate structure when deployed by action of the spring diaphragm 513 (FIG. 5I). The base (or possibly the sidewalls) of the housing 511 can include openings 521 as best shown in FIG. 5H. The openings 521 permit passage of air or other fluids that are present in the environment outside the housing 511 to enter into the interior space of the housing 511. The platform 515 (and the perforating member 521 supported thereon) are secured in a spring-loaded state (with the elastic spring diaphragm 513 under compression) at a position near the base of the housing 511 by environmentally-sensitive material 523 as best shown in FIG. 5F. The environmentally-sensitive material 523 is configured such that it is sensitive to certain predefined environmental conditions of the environmental fluids that enter into the interior space of the housing 511 via the openings 521. Specifically, under normal conditions, the material 523 secures the platform 515 (and the perforating member 521 supported thereon) in the spring-loaded state (with the elastic spring diaphragm 513 under compression) at a position near the base of the housing 511. However, under the predefined environmental conditions, the material 523 is configured to physically change or transform its state where the transformed state releases the platform 515 (and the perforating member 521 supported thereon) and permits action of the spring diaphragm 513 where the spring-forces of the compressed spring diaphragm 513 drive the platform 515 (and the perforating member 521 supported thereon) away from the base of the housing 511 as best shown in FIG. 5I. When the spring-diaphragm 513 is released from its compressed state, the movement of the perforating member 521 away from the base of the housing 511 causes the sharp distal tip of the perforating member 521 to pierce or puncture the multilayer laminate structure as shown in FIGS. 6A to 6D.

In this embodiment, the spring-activated sensor 503 can be configured to produce an intrusion or perforation in the multilayer laminate structure that is triggered by predefined environmental conditions. Such intrusion or perforation can be detected at the input 415 of the NFC/RFID circuit 301 of FIGS. 4A and 4B, registered by the NFC/RFID circuit 301 and communicated to the external NFC/RFID interrogator 451 as described herein. The external NFC/RFID interrogator 451 can analyze data communicated from the NFC/RFID circuit 301 to interpret the data as a signal that the sensor 503 has been exposed to the predefined environmental conditions, and output an indication (e.g., visual or audible notification) of the exposure to the predefined environmental conditions if and when detected.

In one embodiment, the environmentally-sensitive material 523 of the spring-activated sensor 503 can be a wax or other substance like a low melting solder alloy of bismuth, indium, tin that is configured to melt (or soften) at temperatures above a predefined critical temperature $T_c$. In this configuration, the wax or other material melts (or softens) when the temperature of the environmental fluids (e.g., air or other fluid) that enters into the interior space of the housing 511 matches or exceeds the predefined critical temperature $T_c$. The melting or softening of the wax or other material releases the platform 515 (and the perforating member 521 supported thereon) and permits release of the compressed spring diaphragm 513 that drives movement of the perforating member 521 away from the base of the housing 511 such that the sharp distal tip of the perforating member 521 pierces or punctures the multilayer laminate structure when the temperature of the environmental fluids (e.g., air or other fluid) that enters into the interior space of the housing 511 matches or exceeds the predefined critical temperature $T_c$. The critical temperature $T_c$ of the wax or other substance can vary based on composition and other parameters of the substance. Such parameter(s) can be controlled to set the critical temperature $T_c$ of the substance. In this embodiment, the sensor 503 is configured to produce an intrusion or perforation in the multilayer laminate structure when the temperature of the environmental fluids (e.g., air or other fluid) that enters into the interior space of the housing 511 matches or exceeds the predefined critical temperature $T_c$, and such intrusion or perforation can be detected by the NFC/RFID circuit 301, registered by the NFC/RFID circuit 301, and communicated to the external NFC/RFID interrogator 451 as described herein. The external NFC/RFID interrogator 451 can analyze data communicated from the NFC/RFID circuit 301 to interpret the data as a signal that the environment exposed to the sensor 503 has been subject to temperatures that match or exceed the predefined critical temperature $T_c$.

In another embodiment, the environmentally-sensitive material 523 of the spring-activated sensor 503 can be a deliquescent solid-phase material that absorbs water or moisture and that is dissolved by the absorbed water or moisture. The material 523 can be configured to dissolve and release the platform 515 (and the perforating member 521 supported thereon) from its spring loaded state when a predetermined amount of water or moisture enters into the interior space of the housing 511 and reacts with material 523. The release of the platform 515 permits release of the compressed spring diaphragm 513 that drives movement of the perforating member 521 away from the base of the housing 511 such that the sharp distal tip of the perforating member 521 pierces or punctures the multilayer laminate structure when the predetermined amount of water or moisture enters into the interior space of the housing 511 and reacts with material 523. The predetermined amount of water or moisture can be related to a critical relative humidity level $H_c$ (such as 30% or 40% relative humidity) present for a preset amount of time given the mass of the deliquescent material. In this manner, the mass of deliquescent material, the critical relative humidity level $H_c$ and the time sets the predetermined amount of water or moisture. The predetermined amount of water or moisture and the corresponding critical relative humidity level $H_c$ for the deliquescent material can vary based on composition, mass distribution and other parameters of the material. Such parameter(s) can be controlled to set the critical relative humidity $H_c$ of the material. In this embodiment, the sensor 503 is configured to produce an intrusion or perforation in the multilayer laminate structure when the predetermined amount of water or moisture corresponding to the critical relative humidity level $H_c$ enters into the interior space of the housing 511, and such intrusion or perforation can be detected the NFC/RFID circuit 301, registered by the NFC/RFID circuit 301, and communicated to the external NFC/RFID interrogator 451 as described herein. The external NFC/RFID interrogator 451 can analyze data communicated from the NFC/RFID circuit 301 to interpret the data as a signal that the environment exposed to the sensor 503 has been subject to relative humidity levels that match or exceed the predefined critical relative humidity $H_c$.

Alternatively, the sensor 503 can be used in conjunction with the multilayer laminate structure 200 of FIG. 3. In this embodiment, under normal conditions absent intrusion or perforation, the multilayer laminate structure 200 provides a relatively high impedance electrical current path between the first and second conductive layers 101 and 103 and between the two antenna terminals electrically coupled thereto. The relatively high impedance current path between the two antenna terminals allows the NFC/RFID circuit 301 to harvest power from the electromagnetic radiation provided by an external NFC/RFID interrogator and use such harvested power as supply to the electrical components of the NFC/RFID circuit 301 for its operations. However, in response to an intrusion or perforation produced by the sensor 503 and triggered by the predefined environmental conditions, the transformative material 107 of the multilayer laminate structure 200 can adapt to provide all or part of a relatively low impedance electrical current path between the first and second conductive layers 101 and 103 and between the two antenna terminals electrically coupled thereto. Such relatively low impedance electrical current path automatically configures the NFC/RFID circuit 301 to remain in a power-off state in the presence of electromagnetic radiation that is normally sufficient to provide electrical power to the NFC/RFID circuit 301. In this manner, if the NFC/RFID circuit 301 remains in a power-off state in the presence of electromagnetic radiation provided by an external NFC/RFID interrogator that is normally sufficient to provide electrical power to the NFC/RFID circuit 301, the external NFC/RFID interrogator 301 can sense this power-off state, interpret this power-off state as a signal that the sensor 503 has been exposed to the predefined environmental conditions, and output an indication (e.g., visual or audible notification) of the exposure to the predefined environmental conditions if and when detected.

Figure 6A:
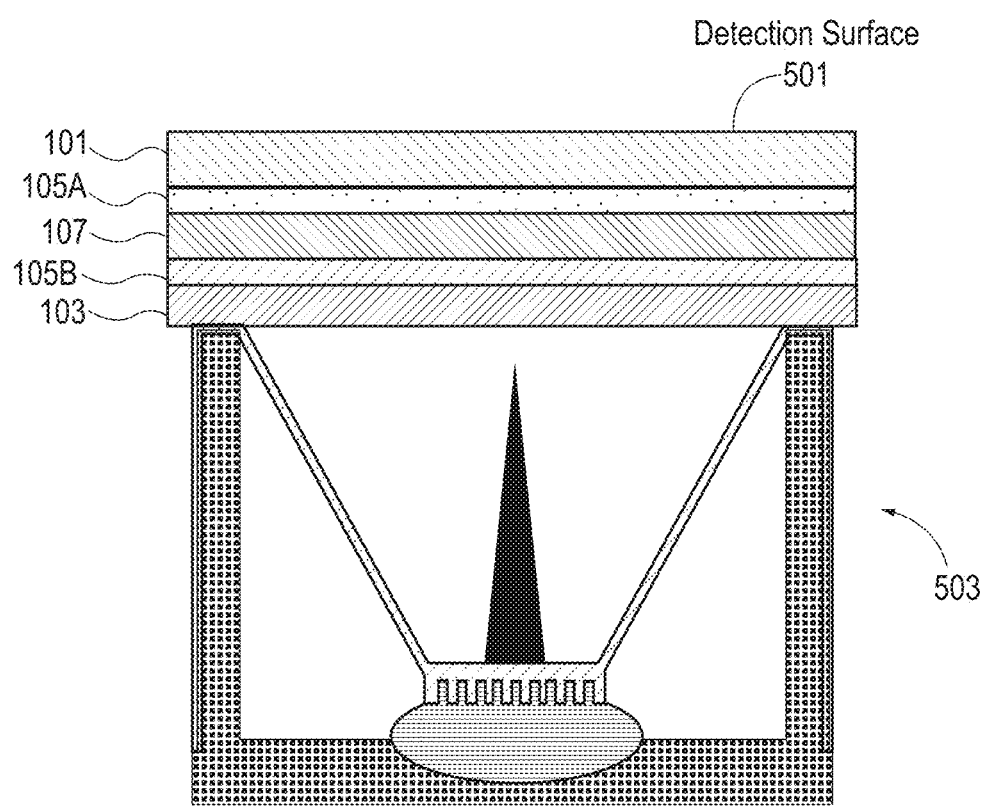
FIGS. 6A-6D are schematic diagrams of an exemplary perforation through the multilayer laminate structure of FIGS. 5A-5I as produced by the sensor of the system in response to predetermined environmental conditions, and the galvanic displacement reaction and resulting structural and electrical changes to the multilayer laminate structure that result from such perforation.

Note that under normal conditions absent an intrusion or perforation as shown in FIG. 6A, the multilayer laminate structure in the vicinity of the detection surface 501 has a configuration that provides a relatively high impedance electrical current path between the detection surface 501 (from by the patterned conductive layer 101) and the opposed conductive layer 103. However, in response to an intrusion or perforation caused by the spring-activated movement of perforating member 521 triggered by predefined environmental conditions, the multilayer laminate structure automatically reconfigures itself to a different configuration where metal ions of the metal ion solution (e.g., silver ions of a silver nitrate gel solution) precipitate to form solid-phase metal (e.g., silver) that provides part or all of a relatively low impedance electrical current path between the first and second conductive layers 101 and 103 as shown in FIGS. 6B to 6D.

Figure 6B:
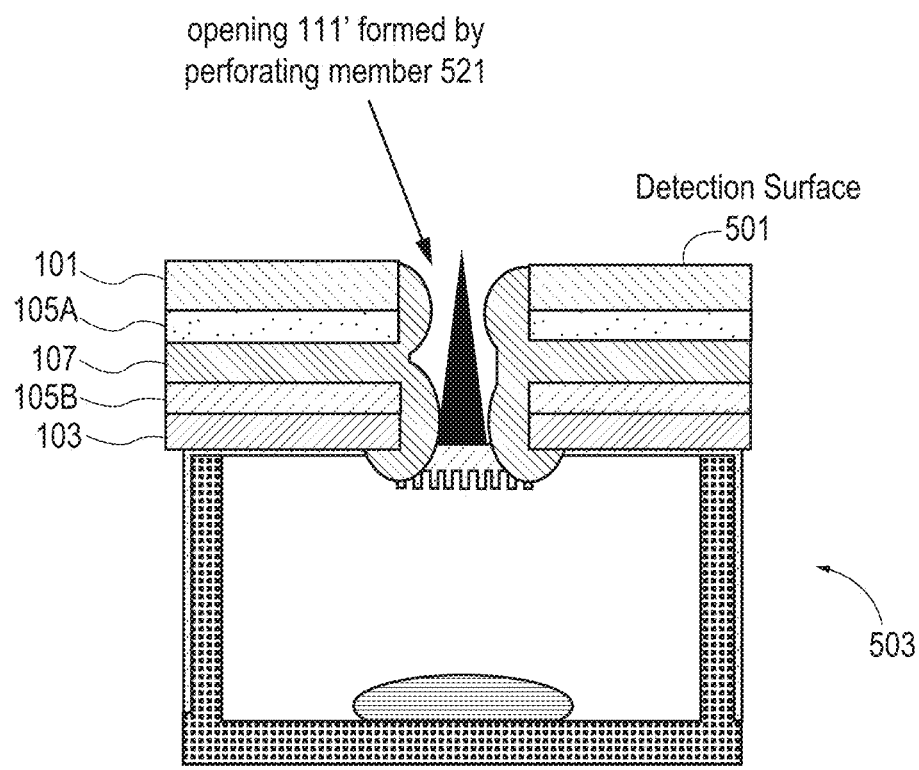
Figure 6C:
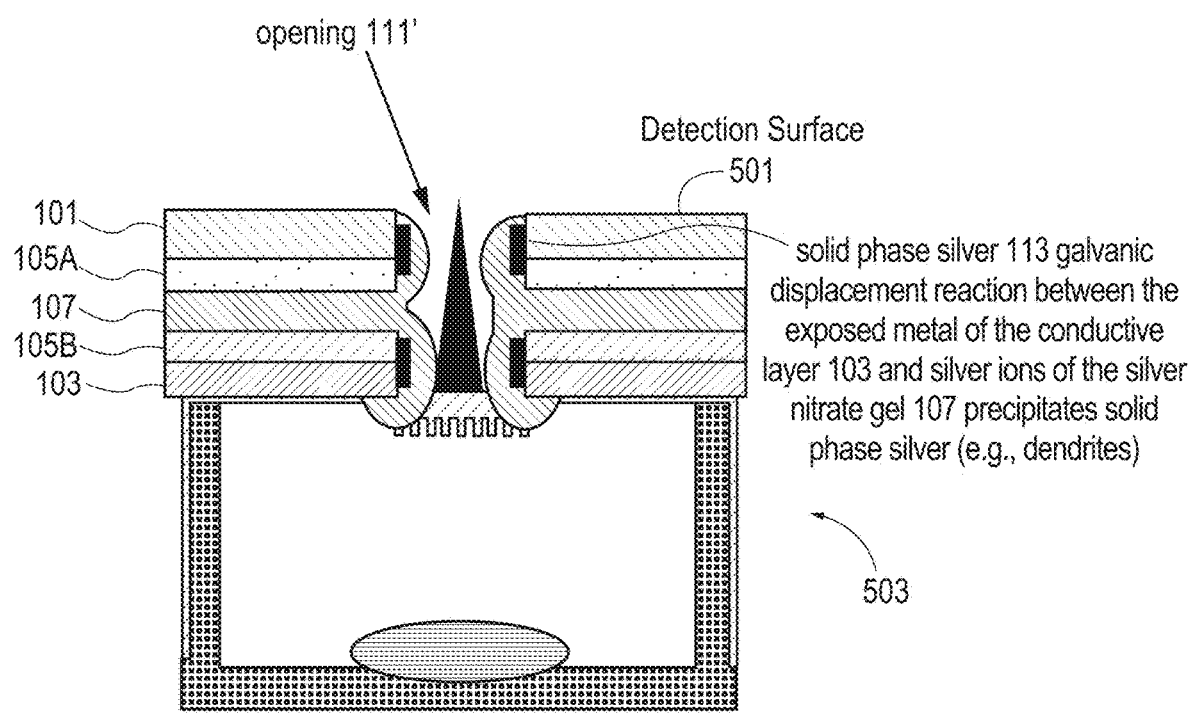

More specifically, the movement of perforating member 521 can form an opening 111' that extends completely through the first and second conductive layers 101, 103 of the multilayer laminate structure as shown in FIG. 6B. In response to such intrusion or perforation, the metal ion solution (e.g., silver nitrate gel solution) can be displaced (or flow) through this opening 111' and contact both the first and second conductive layers 101, 103 as shown. The metal ion solution (e.g., silver nitrate gel solution) by itself is conductive. Thus, if sufficient metal ion solution is present in the space between the first and second conductive layers 101 and 103, the initial displacement (flow) of the metal ion solution (e.g., silver nitrate gel solution) can form all or part of a low impedance current path between the first and second conductive layers 101 and 103.

Furthermore, with the metal ion solution (e.g., silver nitrate gel solution) in contact with the appropriate metal(s) of the first and second conductive layers 101 and 103, the metal ion solution (e.g., silver nitrate gel solution) can undergo a galvanic displacement reaction that precipitates solid-phase metal (e.g., silver) in response to the intrusion. The solid-phase metal (e.g., silver) precipitate can extend from the second conductive layer 103 through the adjacent intermediate layer 105B as shown in FIG. 6C. The metal ion solution 107 by itself is conductive. Thus, if sufficient metal ion solution 107 (e.g., silver nitrate gel solution) is present in the space between the deposited solid-phase metal (e.g., silver) and the intermediate layer 105A or the first conductive layer 101, the solid-phase metal precipitate (e.g., silver) in conjunction with the metal ion solution (e.g., silver nitrate gel solution) can form all or part of a relatively low impedance electrical current path between the first and second conductive layers 101 and 103.

Figure 6D:
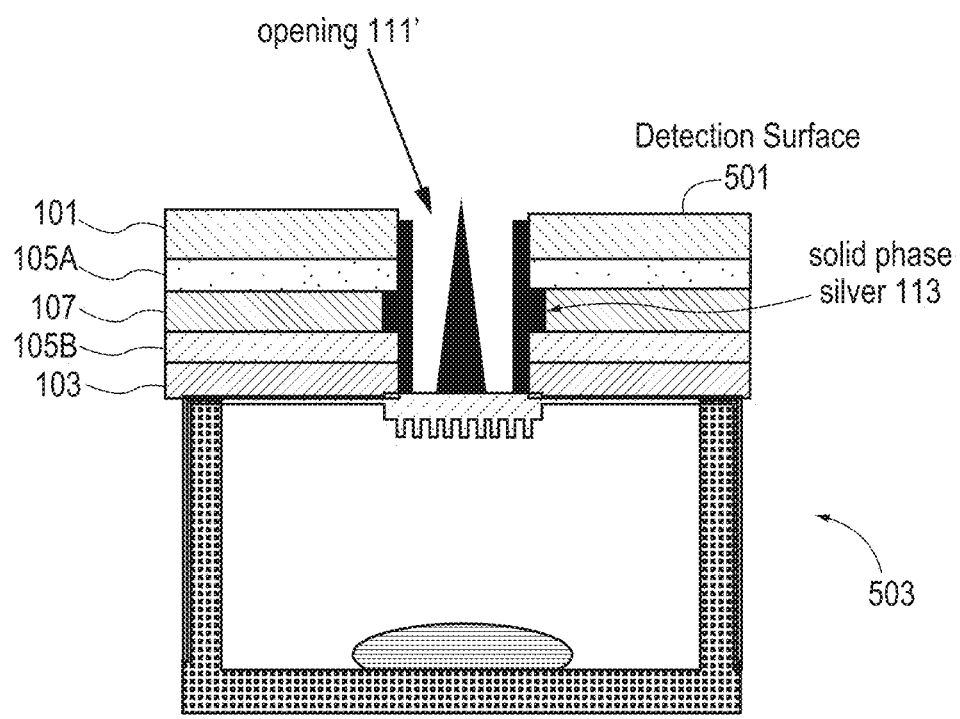

Moreover, the precipitation of the solid-phase metal (e.g., silver) can continue such that the solid-phase metal precipitate extends between first and second conductive layers 101 and 103 as shown in FIG. 6D. In this manner, the solid-phase metal precipitate alone (e.g., silver), without any conductive metal ion solution (e.g., silver nitrate gel solution), can form all or part of a relatively low impedance electrical current path between the first and second conductive layers 101 and 103.

Figure 7:
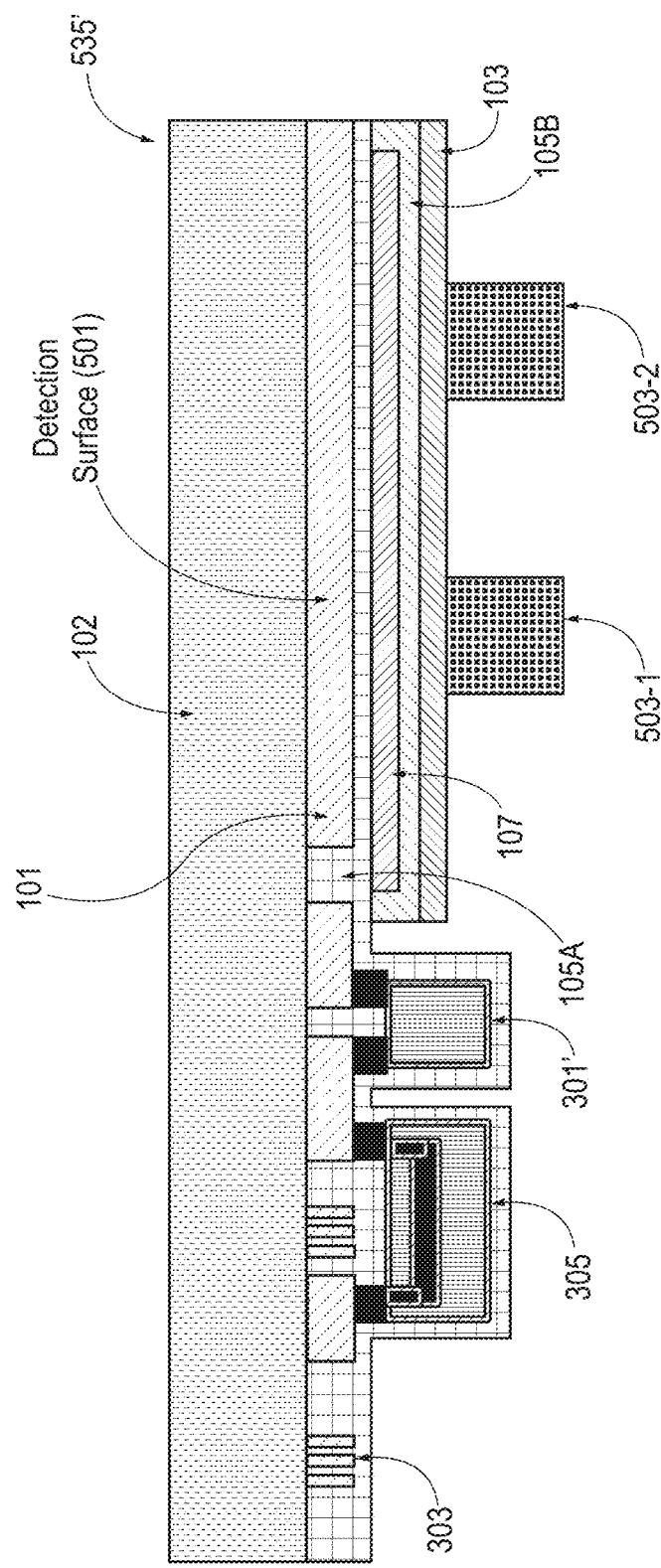
FIG. 7 is a schematic diagram of another exemplary packaging system that includes a multilayer laminate structure with NFC/RFID circuit and coil antenna and two sensors.

In embodiments, the packaging system as described herein (the multilayer laminate structure with NFC/RFID circuit and coil antenna) can employ two or more spring-activated sensors for detecting predefined environment conditions. For example, FIG. 7 illustrates an embodiment of a packaging system 535' that is similar to the system 535 of FIG. 5E but includes two spring-activated sensors 503-1, 503-2 that are bonded to or otherwise mounted adjacent to or on the conductive layer 103 opposite the detection surface 501. In this case, the spring-activated sensors 503-1, 503-2 can be configured to detect different environmental conditions.

Figure 8:
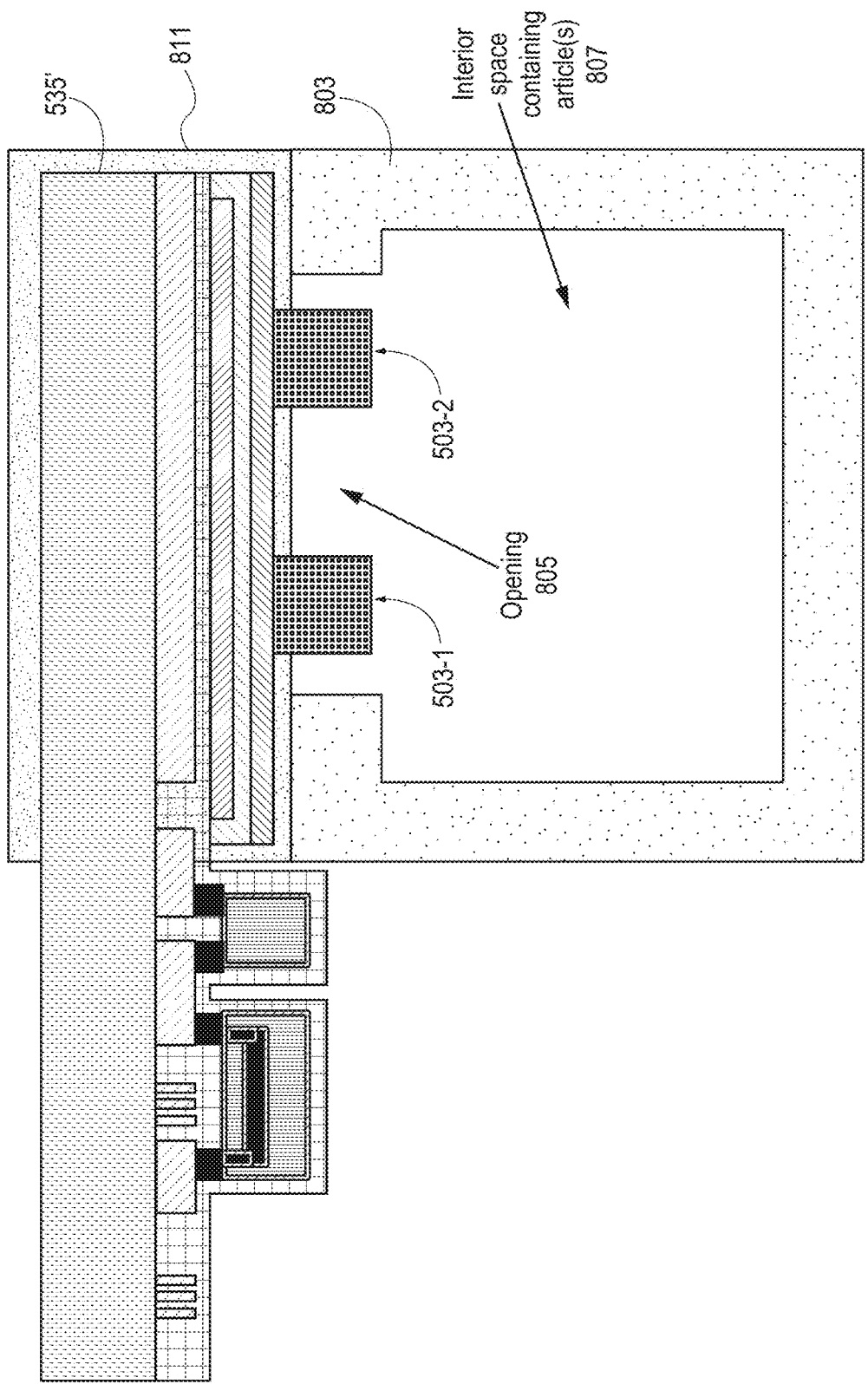
FIG. 8 is a schematic cross-sectional diagrams where the packaging system of FIG. 7 provides a barrier into the sealed opening of a container.

In embodiments, the packaging system as described herein (the multilayer laminate structure with NFC/RFID circuit and coil antenna and at least one spring-activated sensor) can be used as a sensing barrier or surface that protects the opening into a rigid closed-wall container (such as glass bottle) that houses at least one article. For example, FIG. 8 shows an example embodiment where the packaging system 532' (which includes the multilayer laminate structure with NFC/RFID circuit and coil antenna and two spring-activated sensors) of FIG. 7 is secured with a sealant 811 about an opening 805 into a rigid closed-wall container (such as glass bottle) 803. In this configuration, the packaging system 535' provides a partly or wholly sealed protective barrier that can detect and register environmental conditions of the interior space 807 of the container 803 and communicate data representing such environmental conditions. Note that the multilayer laminate structure of the system 535' extends laterally across the upper wall of the container 803 beyond the opening 805, which offers protection for intrusion at the sealed interface between the container 803 and the barrier. The sensors 503-1 and 503-2 are disposed inside the interior space 805 of the container 803, or otherwise disposed in communication with the environmental conditions of the interior space 805 of the container 803. In embodiments, the sealant 811 can be an epoxy thermoset sealant, which can be cured by UV light, heat or other means.

In other embodiments, the packaging system as described herein (which includes multilayer laminate structure with NFC/RFID circuit and coil antenna) can be used as a sensing barrier that defines and protects a sealed envelope or pouch or box or other container. In this embodiment, one or more sensors 503 can be disposed inside the interior space of the container or otherwise disposed in communication with the environmental conditions of the interior space of the container.

In embodiments, the transformative material 107 of the packaging system as described herein can include a metal ion solution (e.g., silver nitrate gel solution) that is displaced (or flows) or undergoes a galvanic displacement reaction that precipitates solid-phase metal (e.g., silver) in response to the intrusion or perforation through the multilayer laminate structure, where the displacement or the precipitation of the solid-phase metal or both changes the impedance between the first and second conductive layers.

In other embodiments, the transformative material 107 of the multilayer laminate structure as described herein can be an electrolyte of other metals or alloys that undergo a galvanic displacement reaction to form a solid-phase precipitate that changes the impedance between the opposed conductive layers of the laminate structure. For example, the electrolyte can include cooper, lead, tin, nickel, cadmium or other metals. In this case, the outer conductive layer of the multilayer laminate structure that contributes to the galvanic displacement reaction can be formed from a less noble metal (which has a lower galvanic potential).

In other embodiments, the multilayer laminate structure can include a chemical reagent that assists or enhances the galvanic displacement reaction or physical change of the transformative material 107 (such as a silver nitrate gel solution). For example, the chemical reagent can be encapsulated by the intermediate layer 105A between the between the first conductive layer 101 and the transformative material 107 (e.g., silver nitrate gel solution). Other configurations can be used to encapsulate the chemical reagent within the multilayer laminate structure in close proximity to the transformative material 107.

In embodiments, the chemical reagent can include a reducing agent (e.g., sodium borohydride) that can be released by the intrusion event and mix with the transformative material 107 to assist in the chemical reaction or physical change of the transformative material that results in the formation of the low impedance current path between the first and second conductive layers 101 and 103. The reducing reagent can be configured to react with the transformative material in response to an intrusion event and aids in the transformation of the transformative material. For illustrative purposes, the chemical reagent 109 can be a solution of sodium borohydride and/or glucose that assists or enhances the galvanic displacement reaction of the silver nitrate solution that precipitates solid-phase silver. The chemical reagent 109 can possibly include other components such as catalysts, stabilizers, surfactants or initiators, in any combination thereof.

In other embodiments, the multilayer laminate structure can include microcapsules of a chemical reagent that are dispersed in a matrix of the transformative material 107. The chemical reagent microcapsules can be formed by a thin film insulator encapsulant that surrounds a small volume of the chemical reagent. The chemical reagent that fills the microcapsules can include a reducing agent (e.g., sodium borohydride) that can be released by the intrusion event and mix with the transformative material 107 to assist in the chemical reaction or physical change of the transformative material that results in the formation of the low impedance current path between the first and second conductive layers 101 and 103. The reducing reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof.

In other embodiments, the multilayer laminate structure can include microcapsules of the transformative material that are dispersed in a matrix of chemical reagent. The transformative material microcapsules can be formed by a thin film insulator encapsulant that surrounds a small volume of the transformative material (e.g., silver nitrate gel solution). The matrix of chemical reagent includes a reducing agent (e.g., sodium borohydride). The transformative material of the microcapsules can be released by the intrusion event and mix with the chemical reagent matrix to assist in the chemical reaction or physical change of the transformative material that results in the formation of the low impedance current path between the first and second conductive layers 101 and 103. The reagent can be configured to react with the transformative material in response to an intrusion event and aids in the transformation of the transformative material. For illustrative purposes, the chemical reagent matrix can be a solution of sodium borohydride and/or glucose that assists or enhances the galvanic displacement reaction of the silver nitrate solution that precipitates solid-phase silver. The chemical reagent matrix can possibly include other components such as catalysts, stabilizers, surfactants or initiators, in any combination thereof. In this embodiment, the intermediate layers 105A and 105B of the laminate structure can be omitted.

In other embodiments, the multilayer laminate structure can include microcapsules of chemical reagent and microcapsules of transformative material that are both dispersed in an inert matrix. The chemical reagent microcapsules can be formed by a thin film insulator encapsulant that surrounds a small volume of the chemical reagent. The transformative material microcapsules can be formed by a thin film insulator encapsulant that surrounds a small volume of the transformative material (e.g., silver nitrate gel solution). The chemical reagent microcapsules include a chemical reagent (such as a reducing agent of sodium borohydride). The chemical reagent and the transformative material of the microcapsules can be released by the intrusion event and mix with one another in the inert matrix to assist in the chemical reaction or physical change of the transformative material that results in the formation of the low impedance current path between the first and second conductive layers 101 and 103. The chemical reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof. Note that in this embodiment, the intermediate layers 105A and 105B of the laminate structure can be omitted.

Figure 9:
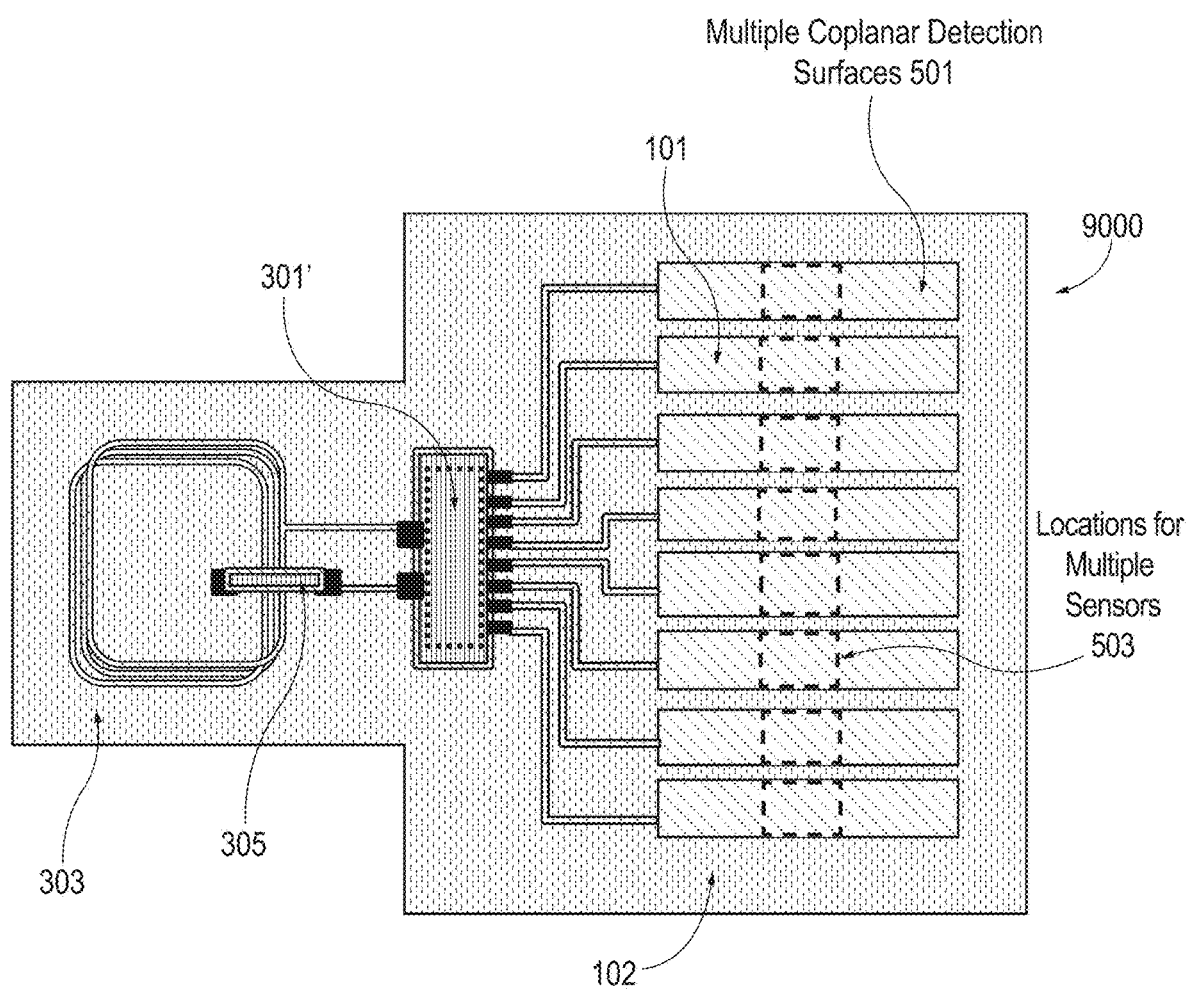
FIG. 9 is a schematic diagram illustrating another exemplary packaging system that includes a multilayer laminate structure with a plurality of coplanar detection surfaces that are electrically coupled to corresponding inputs of an NFC/RFID circuit and coil antenna. The packaging system also includes multiple sensors that produce perforations in the plurality of coplanar detection surfaces in response to different environmental conditions.

In other embodiments, the conductive layer 101 can be patterned to form a plurality of separate coplanar detection surfaces where each one of the plurality of detection surfaces are electrically coupled to independent inputs of one or more NFC/RFID circuits and corresponding antenna coil(s). Multiple spring-activated sensors can be bonded to or otherwise mounted adjacent to or on the respective detection surfaces. In this case, the multiple sensors can be configured to detect different environmental conditions. For example, the multiple sensors can be configured with materials that provide for temperature and humidity level sensing. In another example, the multiple sensors can be configured with different materials that melt or soften at different critical temperatures to provide for temperature detection at the different critical temperatures. In another example, the multiple sensors can be configured with the deliquescent solid-phase materials that dissolve at different critical relative humidity levels to provide for humidity detection at the different critical relatively humidity levels. In yet another example, a mix of temperature and humidity spring-activated sensors can be provided. In this embodiment, the multiple sensors can be placed over multiple detection surfaces yielding valuable environmental data inside the package that can be registered in the NFC/RFID chipset and communicated therefrom to the external NFC/RFID interrogator. FIG. 9 is a schematic diagram illustrating an exemplary packaging system 9000 that includes a multilayer laminate structure with multiple coplanar detection surfaces 501 (for example, eight shown) that are electrically coupled to corresponding inputs of an NFC/RFID circuit 301' and coil antenna 303. The packaging system 9000 also includes multiple sensors 503 (which are bonded to or otherwise disposed adjacent the opposed conductive layer 103 in the manner similar to the embodiment of FIG. 5E) at locations corresponding to the multiple coplanar detection surfaces 501 as noted by the dotted line regions in FIG. 9. The multiple sensors produce perforations in the plurality of coplanar detection surfaces in response to different environmental conditions.

Figure 10:
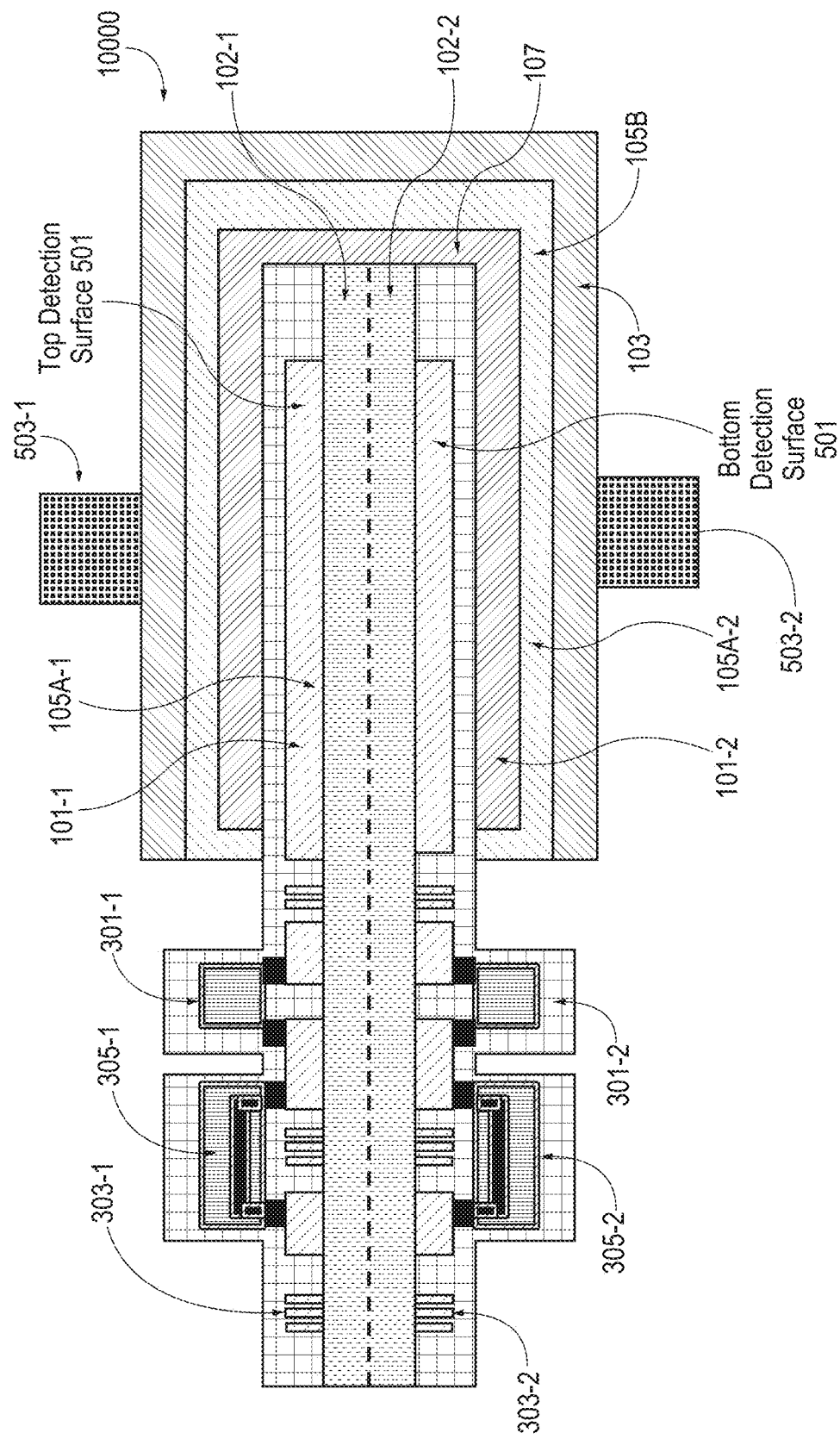
FIG. 10 is a schematic diagram illustrating another exemplary packaging system that includes a multilayer laminate structure with two stacked detection surfaces that are electrically coupled to corresponding inputs of two NFC/RFID circuits and coil antennae. The packaging system also includes two sensors that produce perforations in the two coplanar detection surfaces in response to different environmental conditions.

In other embodiments, a plurality of multilayer laminate structures can be arranged in a stacked configuration (vertically above one another) where each one of the plurality of multilayer laminate structures are electrically coupled as an independent input to one or more NFC/RFID circuits and corresponding antenna coil(s). Each multilayer laminate structure may be electrically coupled to multiple grounds/commons or to a single ground/common layer connecting each capacitive detecting plane. Sealant layer(s) or substrate(s) can be interposed between the multilayer laminate structures and secure the multilayer laminate structures together to form the stacked configuration. The sealant layer(s) or substrate(s) can also provide for electrical isolation between the adjacent multilayer laminate structures. Multiple spring-activated sensors can be bonded to or otherwise mounted adjacent to or on the respective conductive layers of the stacked laminate structures. In this case, the multiple sensors can be configured to detect different environmental conditions. For example, the multiple sensors can be configured with materials that provide for temperature and humidity level sensing. In another example, the multiple sensors can be configured with different materials that melt or soften at different critical temperatures to provide for temperature detection at the different critical temperatures. In another example, the multiple sensors can be configured with the deliquescent solid-phase materials that dissolve at different critical relative humidity levels to provide for humidity detection at the different critical relatively humidity levels. In yet another example, a mix of temperature and humidity spring-activated sensors can be provided. In these embodiments, the multiple sensors can be placed over multiple vertically-stacked detection surfaces yielding valuable environmental data inside the package that can be registered in the NFC/RFID chipset and communicated therefrom to the external NFC/RFID interrogator. FIG. 10 is a schematic diagram illustrating an exemplary packaging system 10000 that includes a multilayer laminate structure with two stacked detection surfaces 501-1, 501-2. The stacked structures are formed by bonding the corresponding substrates 102-1, 102-2 back-to-back such that stacked detection surfaces 501-1, 501-2 are disposed on opposite sides of the joined substrates. The stacked detection surfaces 501-1, 501-2 are encapsulated by thin intermediate layers 105A-1, 105A-2. The detection surfaces 501-1, 501-2 and the intermediate layers 105A-1, 105A-2 are surrounded by a multilayer structure that includes the transformative material 107, intermediate layer 105B and conductive layer 103 as shown. The two stacked detection surfaces 501-1, 501-2 are electrically coupled to corresponding inputs of two NFC/RFID circuits 301-1, 301-2 and coil antennae 303-1, 303-2. The packaging system of FIG. 10 also two sensors 503-1, 503-3. Sensor 503-1 is bonded to or otherwise disposed adjacent the conductive layer 103 opposite the top detection surface 501-1 in the manner similar to the embodiment of FIG. 5E. Sensor 503-2 is bonded to or otherwise disposed adjacent the conductive layer 103 opposite the bottom detection surface 501-2 in the manner similar to the embodiment of FIG. 5E. The multiple sensors 501-2, 501-2 produce perforations in the two stacked detection surfaces 501-1, 501-2 in response to different environmental conditions.

In still other embodiments, the second conductive layer 103 can be positioned facing the package product and closest to the packaged product, while the first conductive layer/detection surface 101 is positioned facing away from the package product and furthest from the packaged product. This embodiment is similar to the embodiments as described above; however, the ordering of the layers of the multilayer laminate structure from the inside to outside is inverted with respect the layer ordering of the embodiments described herein. In this embodiment, one or more spring-activated sensors that pierce or puncture the multilayer laminate structure can bonded to or otherwise mounted adjacent the second conductive layer 103.

In another aspect, a method is provided to detect, register, verify and validate that at least one packaged article has or has not experienced certain environmental conditions. The method employs a packaging system as described herein where at least one operational characteristic of the NFC/RFID circuit is dependent on change in impedance between the first and second conductive layers of the multilayer laminate structure in response to an intrusion or perforation. The perforation is made by at least one spring-activated sensor that is disposed adjacent to or on the multilayer laminate structure and that is exposed to the space occupied by the packaged article(s). The spring-activated sensor includes a perforating member that is deployed under certain environmental conditions (such as certain temperature conditions or certain moisture conditions in the space occupied by the at least one article), where such deployment pierces the multilayer laminate structure to make the perforation through at least part of the multilayer laminate structure. The method includes employing an NFC/RFID interrogator to ascertain the operational characteristic of the NFC/RFID circuit to detect that the at least one packaged article has or has not experienced certain environmental conditions and output an indication (e.g., visual or audible notification) of such environmental conditions if and when detected. The NFC/RFID circuit and NFC/RFID interrogator can cooperate to read other information that is related to the packaged article(s) and stored by the NFC/RFID circuit, such as a product identifier, manufacturing information (such as Plant Number and Lot number), quality control information, shipping information, consumer information (e.g., patient compliance to a course of treatment) and other arbitrary information.

The packaging system and associated method can be used for a wide range of articles, including but not limited to the following:
  medicine (e.g., insulin, vaccines, delicate medicines)
  foods or beverages (e.g., dry foods, meats, fruits, vegetables, wines)
  chemicals (process integrity)
  forensics samples (e.g., collected from the scene of a crime)
  electronics (e.g., specialized microchips)
  electro-mechanical products (e.g., airplane parts)
  branded products (e.g., Gucci, Chanel, Wine, Spirits)
  lifestyle personal products (e.g., condoms, sex toys)
  documents or works of art (e.g., confidential and private documents, paper, books, paintings)
  plastics or rubbers (e.g., beads, buttons, utensils and decorations)
  fabrics or leather goods (e.g., clothing, handbags)
  wood (e.g., as used in light construction)
  combinations of these products or other products thereof Furthermore, the packaging system and method can be used to detect, register, verify and validate that at least one packaged article has or has not experienced certain environmental conditions and read other information that is related to the packaged article(s) and stored by the NFC/RFID circuit over time (e.g., polled by one or more external NFC/RFID interrogators over time). Such operations can be useful as the article is exchanged along a supply chain. The supply chain can include manufacturing, shipping (for an origin to destination with intermediate locations therebetween), warehousing and distribution, retail stores or shops, point of sale terminals, and other arbitrary points along the supply chain.

There have been described and illustrated herein several embodiments of a packaging system that can be used to verify and validate package integrity. While particular embodiments of the invention have been described, it is not intended that the invention be limited thereto, as it is intended that the invention be as broad in scope as the art will allow and that the specification be read likewise. Thus, while particular combinations of materials have been disclosed, it will be appreciated that other suitable materials can be used as well. Moreover, while particular configurations have been disclosed in reference to the containers and forms of the packaging, it will be appreciated that other configurations could be used as well. It will therefore be appreciated by those skilled in the art that other modifications could be made to the provided invention without deviating from its spirit and scope as claimed.

What is claimed is:

1. A packaging system for at least one article, comprising:
  a multilayer laminate structure and at least one sensor, wherein the multilayer laminate structure encapsulates a transformative material between first and second conductive layers, wherein the transformative material is configured to change impedance between the first and second conductive layers in response to a perforation produced by the at least one sensor; and an NFC/RFID circuit electrically coupled to the first and second conductive layers of the multilayer laminate structure, wherein at least one operational characteristic of the NFC/RFID circuit is dependent on the change in impedance between the first and second conductive layers of the multilayer laminate structure due to a perforation produced by the sensor under predetermined environmental conditions.

2. The packaging system of claim 1, wherein:
the sensor includes a spring element and a spring-activated perforating element that are held in a spring-loaded state by an environmentally-sensitive material, wherein the environmentally-sensitive material is configured to change its state in response to the predetermined environmental conditions and release the spring element and perforating element such that the perforating element produces the perforation.

3. The packaging system of claim 2, wherein:
the environmentally-sensitive material is temperature-sensitive and melts or softens at predetermined temperature conditions in order to release the spring element and perforating element such that the perforating element produces the perforation.

4. The packaging system of claim 2, wherein:
the environmentally-sensitive material is sensitive to water or moisture and dissolves at predetermined water or moisture conditions in order to release the spring element and perforating element such that the perforating element produces the perforation.

5. The packaging system of claim 1, wherein:
the multilayer laminate structure has a first configuration that provides a relatively high impedance electrical current path between the first and second conductive layers under normal conditions absent perforation; and
the multilayer laminate structure has a second configuration that provides a relatively low impedance electrical current path between the first and second conductive layers in response to the perforation.

6. The packaging system of claim 1, wherein:
the transformative material undergoes a state change that changes impedance between the first and second conductive layers in response to the perforation produced by the sensor.

7. The packaging system of claim 6, wherein:
the transformative material comprises a reactive material that undergoes a physical change or chemical reaction that irreversibly deposits material that forms to a relatively low impedance electrical current path between the first and second conductive layers in response to the perforation produced by the sensor.

8. The packaging system of claim 7, wherein:
the multilayer laminate structure further includes an encapsulated reagent that reacts with the transformative material to aid the physical change or chemical reaction that irreversibly deposits material that form the relatively low impedance electrical current path between the first and second conductive layers in response to the perforation produced by the sensor.

9. The packaging system of claim 8, wherein:
the multilayer laminate structure includes microcapsules of the transformative material or microcapsules of the reagent or both, where such microcapsules release encapsulated material or reagent for mixing in response to the perforation produced by the sensor.

10. The packaging system of claim 1, wherein:
the transformative material comprises metal ions that undergo a galvanic displacement reaction that precipitates solid-phase metal in response to the perforation, wherein the solid phase metal forms all or part of a low impedance electrical current path between the first and second conductive layers in response to the perforation produced by the sensor.

11. The packaging system of claim 1, further comprising:
an antenna with two antenna terminals that are electrically coupled to the NFC/RFID circuit.

12. The packaging system of claim 11, wherein:
the NFC/RFID circuit is mounted on the multilayer laminate structure; and
the antenna and part of the multilayer laminate structure is printed on a flexible substrate that supports the NFC/RFID circuit.

13. The packaging system of claim 11, wherein:
the NFC/RFID circuit is a passive NFC/RFID circuit that cooperates with the antenna to receive and store electrical power from electromagnetic radiation emitted by an external NFC/RFID interrogator.

14. The packaging system of claim 13, wherein:
the first and second conductive layers of the multilayer laminate structure are electrically coupled to the two antenna terminals; and
the transformative material is configured to provide all or part of a relatively low impedance electrical current path between the first and second conductive layers and the two antenna terminals electrically coupled thereto in response to the perforation produced by the sensor.

15. The packaging system of claim 13, wherein:
one of the first and second conductive layers is configured to define a detection surface;
the transformative material is configured to change impedance between the detection surface and the other conductive layer in response to the perforation produced by the sensor; and
the detection surface is electrically coupled to a corresponding input terminal of the NFC/RFID circuit.

16. The packaging system of claim 15, wherein:
the NFC/RFID circuit has a configuration that detects a signal at the input terminal that results from the change of impedance between the detection surface and the other conductive layer due to the perforation produced by the sensor.

17. The packaging system of claim 16, wherein:
the NFC/RFID circuit is further configured to derive data from such signal and communicate the data to an external NFC/RFID interrogator.

18. The packaging system of claim 1, wherein:
the multilayer laminate structure includes a plurality of coplanar detection surfaces;
a plurality of sensors are provided that produce perforations in the plurality of coplanar detection surfaces in response to different environmental conditions; and
the plurality of coplanar detection surfaces are electrically coupled to separate inputs of at least one NFC/RFID circuit and corresponding coil antenna in order to register the different environmental conditions.

19. The packaging system of claim 1, wherein:
the multilayer laminate structure includes a plurality of stacked detection surfaces;

a plurality of sensors are provided that produce perforations in the plurality of stacked detection surfaces in response to different environmental conditions; and the plurality of stacked detection surfaces are electrically coupled to separate inputs of at least one NFC/RFID circuit and corresponding coil antenna in order to register the different environmental conditions.

20. The packaging system of claim 1, wherein:

the sensor is exposed to the environmental conditions of interior space of a container that houses the at least one article.

21. The packaging system of claim 20, wherein:

the operational characteristic of the NFC/RFID circuit is tested to detect environmental conditions of space that houses the at least one article.

22. The package system of claim 1, wherein:

the at least one article is selected from the group consisting of
medicine
foods or beverages
chemicals
forensics samples
electronics
electro-mechanical products
branded products
lifestyle personal products
documents or works of art
plastics or rubbers
fabrics or leather goods
wood
combinations of these products.

23. A method of monitoring environmental conditions of the at least one packaged article, comprising:

i) providing a packaging system of claim 1; and ii) employing an NFC/RFID interrogator to ascertain the operational characteristic of the NFC/RFID circuit of the packaging system to detect environmental conditions of the at least one article.

24. A method according to claim 23, further comprising:

iii) repeating the operations of ii) at multiple points in time to monitor environmental conditions of the at least one packaged article over time.

25. A method of monitoring environmental conditions of the at least one packaged article, comprising:

i) providing a packaging system of claim 1 as the article is exchanged along a supply chain; and ii) at one or more points along the supply chain, employing an NFC/RFID interrogator to ascertain the operational characteristic of the NFC/RFID circuit of the packaging system to monitor environmental conditions of the at least one packaged article along the supply chain.

* * * * *